US011120151B1

(12) United States Patent
Allo

(10) Patent No.: US 11,120,151 B1
(45) **Date of Patent: *Sep. 14, 2021**

(54) SYSTEMS AND METHODS FOR UNLOCKING SELF-ENCRYPTING DATA STORAGE DEVICES

(71) Applicant: Seagate Technology LLC, Cupertino, CA (US)

(72) Inventor: Christopher Nicholas Allo, Lyons, CO (US)

(73) Assignee: Seagate Technology LLC, Fremont, CA (US)

( * ) Notice: Subject to any disclaimer, the term of this patent is extended or adjusted under 35 U.S.C. 154(b) by 462 days.

This patent is subject to a terminal disclaimer.

(21) Appl. No.: 15/667,533

(22) Filed: Aug. 2, 2017

(51) Int. Cl.
*G06F 21/62* (2013.01)
*H04L 29/06* (2006.01)
(Continued)

(52) U.S. Cl.
CPC .......... *G06F 21/62* (2013.01); *G06F 21/6218* (2013.01); *G06F 21/78* (2013.01); *G06F 21/80* (2013.01); *H04L 9/083* (2013.01); *H04L 9/0822* (2013.01); *H04L 9/0894* (2013.01); *H04L 9/0897* (2013.01); *H04L 63/062* (2013.01); *H04L 63/083* (2013.01); *H04L 63/0823* (2013.01); *G06F 3/067* (2013.01);
(Continued)

(58) Field of Classification Search
CPC ...... G06F 21/6218; G06F 21/62; G06F 21/78; G06F 21/80; H04L 9/0822; H04L 9/083; H04L 9/0894; H04L 9/3263; H04L 9/0897; H04L 63/062; H04L 63/0823; H04L 63/0863
See application file for complete search history.

(56) References Cited

U.S. PATENT DOCUMENTS

| | | | |
|---|---|---|---|
| 6,950,523 | B1 | 9/2005 | Brickell et al. |
| 7,752,463 | B2 | 7/2010 | Hahn et al. |

(Continued)

OTHER PUBLICATIONS

T. Müller and F. C. Freiling, "A Systematic Assessment of the Security of Full Disk Encryption," in IEEE Transactions on Dependable and Secure Computing, vol. 12, No. 5, pp. 491-503, Sep. 1-Oct. 2015. (Year: 2015).*

(Continued)

*Primary Examiner* — Kari L Schmidt
(74) *Attorney, Agent, or Firm* — Kirk A. Cesari

(57) ABSTRACT

Security of computers, data storage devices, and servers can be improved with a multiple key access system. In some embodiments, a local key management device can be a locally (or virtually) located data storage device such as a HDD or SDD. The key management device may be part of a computer or server system and can have a first secure area protected by a cryptographic module (e.g. hardware integrated circuit). The first secure area can store a key to access a second secure area, which may function as a local key management server (LKMS) and store access information to securely communicate with and unlock another data storage device coupled to the computer. For example, the LKMS may store an access key to provide the computer with access to another data storage device. Communications between the LKMS and the other data storage device may be encrypted using a communication key.

20 Claims, 15 Drawing Sheets

(51) Int. Cl.

| | |
|---|---|
| ***G06F 21/78*** | (2013.01) |
| ***H04L 9/08*** | (2006.01) |
| ***G06F 21/80*** | (2013.01) |
| *G06F 12/14* | (2006.01) |
| *G06F 3/06* | (2006.01) |

(52) U.S. Cl.

CPC .......... *G06F 3/0622* (2013.01); *G06F 3/0659* (2013.01); *G06F 12/1408* (2013.01)

(56) References Cited

U.S. PATENT DOCUMENTS

| | | | | |
|---|---|---|---|---|
| 7,877,603 | B2 | 1/2011 | Goodman et al. | |
| 7,953,678 | B2 | 5/2011 | Hunter | |
| 7,953,978 | B2 | 5/2011 | Greco et al. | |
| 8,254,577 | B2 | 8/2012 | Almoustafa et al. | |
| 8,295,490 | B1 | 10/2012 | McCoy et al. | |
| 8,300,831 | B2 | 10/2012 | Kahler et al. | |
| 8,411,863 | B2 | 4/2013 | Ureche et al. | |
| 8,474,698 | B1 | 7/2013 | Billett et al. | |
| 8,494,170 | B2 | 7/2013 | Kahler et al. | |
| 8,694,434 | B1 | 4/2014 | Kley | |
| 8,995,654 | B2 | 3/2015 | Tang et al. | |
| 9,202,059 | B2 * | 12/2015 | Bhansali | G06F 21/575 |
| 9,203,819 | B2 | 12/2015 | Fenton et al. | |
| 9,413,526 | B1 | 8/2016 | Kothari et al. | |
| 9,460,317 | B2 | 10/2016 | Nimura et al. | |
| 9,756,033 | B2 | 9/2017 | Isozaki | |
| 9,921,978 | B1 * | 3/2018 | Chan | G06F 21/78 |
| 10,341,310 | B1 * | 7/2019 | Leon | H04L 9/3231 |
| 2003/0041250 | A1 | 2/2003 | Proudler | |
| 2004/0146163 | A1 | 7/2004 | Asokan et al. | |
| 2006/0143600 | A1 | 6/2006 | Cottrell et al. | |
| 2007/0234060 | A1 | 10/2007 | Tsubono | |
| 2008/0022361 | A1 * | 1/2008 | Bharadwaj | G06F 21/6209 726/2 |
| 2008/0065903 | A1 | 3/2008 | Goodman et al. | |
| 2008/0147892 | A1 | 6/2008 | Carlson et al. | |
| 2009/0260064 | A1 | 10/2009 | McDowell et al. | |
| 2009/0290710 | A1 | 11/2009 | Tkachenko et al. | |
| 2009/0293118 | A1 * | 11/2009 | Yan | G06F 21/51 726/19 |
| 2009/0327798 | A1 | 12/2009 | D et al. | |
| 2010/0111309 | A1 | 5/2010 | Khatri et al. | |
| 2011/0258456 | A1 | 10/2011 | Lyakhovitskly | |
| 2011/0261964 | A1 | 10/2011 | Kahler et al. | |
| 2012/0099728 | A1 | 4/2012 | Rich et al. | |
| 2012/0125999 | A1 | 5/2012 | Komatsu et al. | |
| 2012/0151199 | A1 | 6/2012 | Shriver | |
| 2012/0239943 | A1 | 9/2012 | Okamoto | |
| 2012/0321087 | A1 * | 12/2012 | Fleischman | H04L 9/3234 380/279 |
| 2013/0024679 | A1 | 1/2013 | Isozaki | |
| 2013/0067242 | A1 | 3/2013 | Lyakhovitskiy et al. | |
| 2013/0117563 | A1 * | 5/2013 | Grabelkovsky | G06F 16/00 713/165 |
| 2013/0232584 | A1 * | 9/2013 | Baentsch | G06F 21/10 726/29 |
| 2014/0025947 | A1 * | 1/2014 | Jaber | G06F 21/572 713/164 |
| 2014/0089202 | A1 * | 3/2014 | Bond | H04L 9/3239 705/71 |
| 2014/0161251 | A1 | 6/2014 | Yoshida et al. | |
| 2014/0237569 | A1 | 8/2014 | Zhao et al. | |
| 2015/0006910 | A1 | 1/2015 | Shapiro | |
| 2015/0089209 | A1 | 3/2015 | Jacobs et al. | |
| 2015/0121028 | A1 | 4/2015 | Gupta et al. | |
| 2016/0117263 | A1 * | 4/2016 | Kanno | G06F 12/1408 713/171 |
| 2016/0191481 | A1 | 6/2016 | Zimmer et al. | |
| 2016/0197962 | A1 | 7/2016 | Winn et al. | |
| 2016/0277362 | A1 | 9/2016 | Baumgarte et al. | |
| 2017/0012770 | A1 * | 1/2017 | Lin | G06F 21/572 |
| 2017/0076096 | A1 | 3/2017 | Challener et al. | |
| 2017/0083457 | A1 | 3/2017 | Khemani et al. | |
| 2017/0085374 | A1 | 3/2017 | Chen | |
| 2017/0177873 | A1 | 6/2017 | Raghuram et al. | |
| 2017/0244698 | A1 * | 8/2017 | Gale | H04L 63/0853 |
| 2017/0264432 | A1 * | 9/2017 | Horowitz | G06F 21/6218 |
| 2017/0289800 | A1 * | 10/2017 | Frusina | H04W 12/08 |
| 2017/0337140 | A1 * | 11/2017 | Ragupathi | H04L 67/1097 |
| 2018/0041483 | A1 * | 2/2018 | Smith | G06F 21/57 |
| 2018/0205711 | A1 * | 7/2018 | Kumar | H04L 63/06 |
| 2018/0295115 | A1 * | 10/2018 | Kumar | H04L 67/1097 |
| 2019/0068370 | A1 * | 2/2019 | Neerumalla | H04L 9/0897 |
| 2020/0186342 | A1 * | 6/2020 | Zhang | H04L 9/0872 |
| 2020/0244445 | A1 * | 7/2020 | Ponnusamy | G06F 21/44 |
| 2021/0067323 | A1 * | 3/2021 | Dambal | H04L 9/3226 |

OTHER PUBLICATIONS

Choi, Younsung, et al. "Password-based single-file encryption and secure data deletion for solid-state drive." Proceedings of the 8th international conference on ubiquitous information management and communication. 2014, pp. 1-7. (Year: 2014).*

C. Meijer and B. van Gastel, "Self-Encrypting Deception: Weaknesses in the Encryption of Solid State Drives," 2019 IEEE Symposium on Security and Privacy (SP), 2019, pp. 72-87. (Year: 2019).*

Bradley, "Centrally Managing Access for Self-Encrypting Drives in Lenovo Systen x Servers", Mar. 2015, 198 pages.

Oasis, Key Management Interoperability Protocol (KMIP), May 2009, 22 pages.

Opal, "TCG Storage Security Subsystem Class; Opal", Aug. 2015. 80 pages.

Ouellet, Seagate Secure Self-Encrypting Drives with LSI MegaRAID SafeStore Encryption Services for Servers, Product Brief, LSI, San Jose, CA, 2013, 3 pages. file:///C:/Users/CR%20Docket/Downloads/LSI-PB-Seagate-SED-SafeStore.pdf.

Allo et al., "Removable Circuit for Unlocking Self-Encrypting Data Storage Devices", U.S. Appl. No. 15/214,965, filed Jul. 20, 2016, 39 pages.

Allo et al., "Removable Circuit for Unlocking Self-Encrypting Data Storage Devices", U.S. Appl. No. 14/862,128, filed Sep. 22, 2015, 38 pages.

Allo et al., "Systems and Methods for Unlocking Self-Encrypting Data Storage Devices", U.S. Appl. No. 15/436,712, filed Feb. 17, 2017, 45 pages.

Allo et al., "Self-Contained Key Management Device", U.S. Appl. No. 15/498,348, filed Apr. 26, 2017, 46 pages.

Griscioli et al, "Securing Promiscuous use of untrusted USB thumb drives in Industrial Control Systems," 2016 14th Annual Conference on Privacy, Secruity and Trust (PST) Year: 2016 | Conference Paper | Publisher: IEEE.

Reddy et al., "USB SEC: A secure application to manage removable media," 2016 10th International Conference on Intelligent Systems and Control (ISCO) Year: 2016 | Conference Paper | Publisher: IEEE.

Anonymous. "Key Management Interoperability Protocol (KMIP): Addressing the Need for Standardization in Enterprise Key Management", KMIP White Paper. Version 1.0, pp. 22, May 20, 2009.

* cited by examiner

SYSTEMS AND METHODS FOR UNLOCKING SELF-ENCRYPTING DATA STORAGE DEVICES

SUMMARY

In some embodiments, an apparatus can comprise a data storage device configured to connect to be removable from a first server. A key management system stored locally in the data storage device can be loaded into the memory of the first server, the key management system configured to unlock a first secure area of the data storage device; retrieve a first access key from the first secure area; and unlock a second secure area of the data storage device with the first access key. The key management system can also be configured to retrieve a communication key from the first secure area or the second secure area; determine a second access key based on information stored to the second secure area; and unlock a secure storage area of another data storage device with the second access key, the system configured to use the communication key to secure communication between the system and the other data storage device while performing the unlock of the secure storage area of the other data storage device.

In some embodiments, a system can include a data storage device configured to be connectable and removable from a first server. The data storage device can include: an interface circuit, a first secure nonvolatile data storage area, a second secure nonvolatile data storage area separate from the first secure nonvolatile data storage area, a memory storing a key management system, and a controller. The controller can be configured to load the key management system into the memory of the first server. The key management system can be configured to: access a hardware encryption circuit of the first server; obtain access to the first secure nonvolatile data storage area of the data storage device via the hardware encryption circuit, retrieve a first access key from the first secure nonvolatile data storage area when access is granted to the key management operating system, utilize the first access key to access the second secure nonvolatile data storage area, retrieve a communication key from the first secure nonvolatile data storage area or the second secure nonvolatile data storage area, determine a second access key based on information stored to the second secure nonvolatile data storage area, and unlock an encrypted data storage device ("DSD") connected to the first server with the second access key, the key management system configured to use the communication key to secure communication between the key management system and the encrypted second DSD while performing the unlock of the encrypted second DSD.

In some embodiments, a memory device can store instructions that when executed cause a processor to perform a method. The method may include: accessing a hardware encryption circuit of a first server; obtaining access to a first secure nonvolatile data storage area of a first data storage device via the hardware encryption circuit; retrieving a first access key from the secure nonvolatile data storage area when access is granted; unlocking a second secure nonvolatile data storage area of the first data storage device with the first access key; retrieving a communication key from the first secure nonvolatile data storage area or the second secure nonvolatile data storage area, determining a second access key from the second secure nonvolatile data storage area; and unlocking, via the second key and using the communication key to secure communication, a second data storage device with the second access key.

DETAILED DESCRIPTION

In the following detailed description of the embodiments, reference is made to the accompanying drawings which form a part hereof, and in which are shown by way of illustrations. Features of the various described embodiments may be combined, other embodiments may be utilized, and structural changes may be made without departing from the scope of the present disclosure. Features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, the methods and functions described herein may be implemented as one or more software programs running on a computer processor or controller. In accordance with various embodiments, the methods and functions described herein may be implemented as one or more software programs running on a computing device, such as a server, a data storage device (e.g. a solid state drive, a hard drive, a hybrid drive), or a combination thereof. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Figure 1:
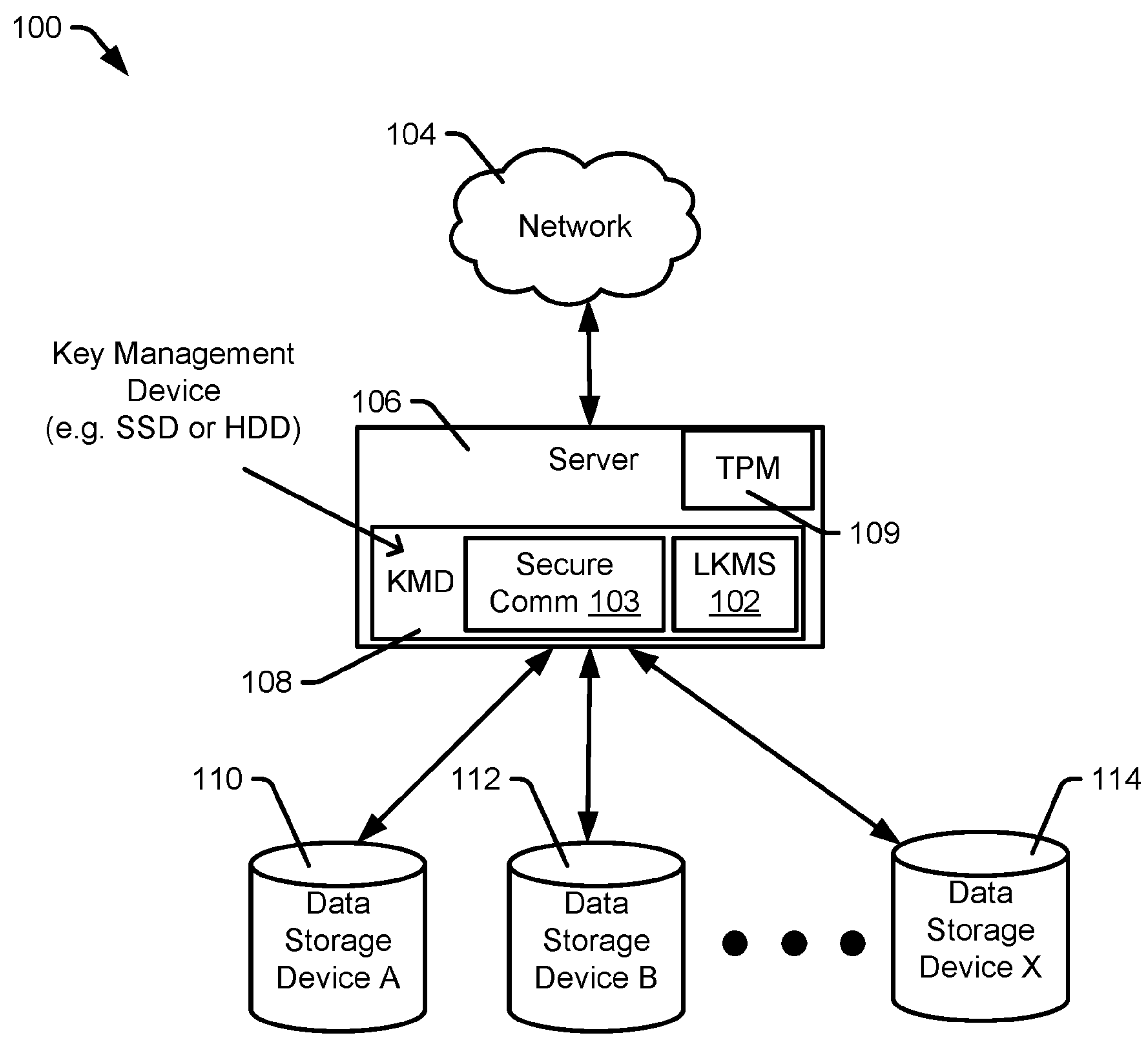
FIG. 1 is a diagram of a system of a removable circuit for unlocking self-encrypting data storage devices, in accordance with certain embodiments of the present disclosure.

Referring to FIG. 1, certain embodiments of a system of a removable circuit for unlocking self-encrypting data storage devices are shown and generally designated 100. System 100 can include a local key management server ("LKMS") 102 and a secure communication module 103 that are locally part of a server 106 which can be connected to a network 104, which may be a wired or wireless network and may be any type of network. The server 106 may be a data server, file system server, metadata server, web server, application server, network attached storage (NAS), or other server. In some embodiments, the server 106 may include a redundant array of independent discs ("RAID") server. The server 106 may include a key management device ("KMD") 108, and may be coupled to one or more data storage devices ("DSDs"), such as DSDs A 110, B 112, and X 114. Further, the server 106 may include a trusted platform module ("TPM") 109 that can implement security protocols. The TPM 109 may be implemented as software, hardware, or a combination thereof such as security controller implementing firmware. In some embodiments, the TPM 109 may be a secure cryptographic integrated circuit ("IC") that is configured to manage user authentication, network access, data protection, or a combination thereof.

The DSDs A 110, B 112, and X 114, may be self-encrypting drives ("SEDs") and can be a solid-state drive ("SSD"), a hard disc drive ("HDD"), a hybrid drive, or a combination thereof. SEDs may encrypt data by itself, such as before data is stored to a storage medium (e.g. magnetic discs or flash memory) and decrypt the data as the data is retrieved from the storage medium. An SED may encrypt data with an internally stored encryption key that is not accessible outside of the SED, and may further decrypt encrypted data with a corresponding decryption key. In some examples, an SED's encryption key may be a symmetric key used by an SED's encryption engine to encrypt plaintext (i.e. data in transit) into cipher text (i.e. encrypted data) when the data is stored to the SEDs and to decrypt cipher text into plain text when data is read from the SEDs.

An SED may be said to be unlocked when a correct symmetric key (or other key combinations) has been provided, thus allowing the encrypted data to be decrypted. An SED may be said to be locked when the data remains encrypted and a correct symmetric key (or other key combinations) has not been provided. In some cases, an SED can become locked when power is removed to prevent an unauthorized person from taking the SED and accessing the data. In order to gain access to the encrypted data when power is restored, a correct access key must be provided to the SED.

In addition, the SED may be configured to securely perform communications related to the locking and unlocking of the SED. For example, the secure communication may be performed using pre-shared key(s) or a public/private key infrastructure using digital certificate(s) when communicating the symmetric keys (or other key combinations).

In some embodiments, the KMD 108 may be a removable storage device, such as a HDD, SSD, or hybrid drive, which may also be an SED. The KMD may store a key management system in a non-secure data storage area of the KMD that can be loaded into the server memory for execution of the security protocols to unlock, register, or perform other functions on any SEDs connected to the server, or in communication with, the server. Depending on the implementation, the specifics of the key management system may vary. For example, in some examples, the key management system may be an operating system which may be loaded during boot prior to the loading of the native operating system of the server 106. Examples of such embodiments are discussed below with regard to FIGS. 2 and 6-8. In other examples, the key management system may be a Basic Input Output System (BIOS) such as a UEFI BIOS. Examples of such embodiments are discussed below with regard to FIGS. 3 and 9-11. Of course, where details between these examples types vary in this disclosure, other than where necessitated by a difference between the disclosed OS and UEFI BIOS, the differences may be applied interchangeably. The KMD 108 may include a first secure storage area configured or reserved to store unique identification keys for each of the DSDs A 110, B 112, and X 114. The server 106 may provide secure access to the first reserved storage area of the KMD 108 via utilizing the security protocols of the TPM 109. For example, the KMD 108 may not be able to access data (e.g. other access keys) in the secure reserved storage area until the TPM 109 provides the proper access key to the KMD 108.

Once the KMD 108 has access to the first reserved storage area, the KMD 108 may retrieve an access key to access a second secure reserved storage area of the KMD 108 to retrieve encrypted keys and communication keys corresponding to DSDs A 110, B 112, and X 114 or corresponding to bands thereof. The KMD 108 may also retrieve communication keys corresponding to DSDs A 110, B 112, and X 114 for use in secure communication with the DSD(s). The KMD 108 may retrieve LKMS encrypted keys and communication keys from the second reserved storage area that uniquely identify or are used with the drive(s) or band(s) that the server 106 wants to unlock. Once the KMD 108 receives the LKMS encrypted key(s) and communication keys, it may communicate with and unlock the DSDs A 110, B 112, and X 114 using the retrieved keys. In some examples, once DSD A is unlocked, thus giving the server 106 access to data in DSD A, the KMD 108 may delete the locally stored version of the encrypted key and communication key used to unlock DSD A.

In some examples, the KMD 108 may determine if there are any unregistered SEDs coupled to the server 106. Unregistered SEDs may be SEDs for which no encrypted key is stored in the LKMS 102. For example, if another DSD is coupled to the server 106, that DSD may be said to be unregistered if the LKMS 102 does not already have an encrypted key associated with the newly coupled DSD. To register unregistered DSDs, the KMD 108 may obtain a unique identifier for the unregistered DSDs, and provide the unique identifier to the LKMS 102 and the secure communication module 103. The LKMS 102 can create a unique security ID and a corresponding encrypted key associated with an unregistered DSD. The encrypted key can be stored on the LKMS 102, and the LKMS 102 may provide the security ID and the encrypted key to the KMD 108 upon request. The KMD 108 can lock the SED with the encrypted key. The security ID may be stored to the first secure storage area of the KMD 108, which the security ID may be part of a certificate (e.g. authentication key) that includes the security ID, and the first storage area can be secured by the TPM 109. The KMD 108 may then delete the local version of the encrypted key that was used to lock the corresponding SED. Similarly, the secure communication module 103 can create a unique communication ID and a corresponding communication key to be associated with the unregistered DSD. The communication key can be stored on the secure communication module 103 or the LKMS 102, and the secure communication module 103 may provide the communication ID and the communication key to the KMD 108 upon request. The KMD 108 can provide the communication key to the unregistered SED and configure or instruct the SED to utilize the communication key when performing communications related to unlocking the SED. The communication ID may be stored to the first secure storage area of the KMD 108, which the communication ID may be part of a certificate (e.g. authentication key) that includes the communication ID, and the first storage area can be secured by the TPM 109. The KMD 108 may then delete the local version of the communication key that was used to lock the corresponding SED. From that point on, the SED may be unlocked by communicating with the SED using the communication key stored in the communication module 103 and with the encrypted key stored in the LKMS 102, via the processes described herein. As mentioned above, the communication key may, for example, be a pre-shared key, a public key that is part of a certificate or similar types of keys. In some examples, a certificate may be a digital document that may include a cryptographic key, issuing authority, server name and client name, and other information. In some examples in which a public-private key infrastructure is utilized, the KMD 108 or secure communication module 103 may further provide a public key or certificate of the KMD 108 to the SED during registration.

In some embodiments, the KMD 108 may connect to be removable from the server 106 by physically and electrically connecting and disconnecting the KMD 108 to the server 106 without physically modifying the server 106. For example, the KMD 108 may be a data storage device that can connect via an interface to the server's 106 motherboard without physically modifying (e.g. moving, partially or wholly disassembling, disconnecting, etc.) components (e.g. mother board, graphics cards, processors, memory modules, expansion boards, DSDs, network adapters, power connectors, etc.) in the server 106. For example, to install the KMD 108 in the server 106, a user can simply select an available data storage device interface connection in a motherboard, attach a cable (if needed) with the connectors to the KMD 108 and to the motherboard. In some cases, connecting and disconnecting the KMD 108 in this manner can be accomplished without physically modifying the server 106. In some examples, the KMD 108 may be connected to other circuits in the server, such as an expansion card or memory bus. In some examples, the KMD may connect to be removable from the server 106 via intelligent drive electronics ("IDE"), serial advanced technology attachment ("SATA"), or another interface (e.g. SAS, NVMe, PCIe,). Further, the KMD 108 may be removed from a server and connected to another server with little to no modification. The KMD 108 may be connected or disconnected from the server 106 when the server 106 is powered off or while the server 106 is still powered on.

In some examples, the KMD 108 may be located outside of the server's 106 physical enclosure, and may be physically connected and disconnected from the server 106 via an external interface without physically modifying the server 106. For example, the KMD 108 can connect to be removable from the server 106 via a serial bus, such as IEEE 1194, or another interface. In some embodiments, the KMD 108 can be a memory device that can connect to the server 106 via a USB interface, external serial advanced technology attachment ("eSATA"), or other interface. When the KMD 108 is connected to the server 106 via an external interface, the user can physically insert the KMD 108 into the appropriate interface directly or with interface cables. The KMD 108 may receive power from the server 106, or may be powered with a separate power supply. To remove the KMD 108 from the server 106, a user may physically remove the KMD 108 from the corresponding interface in the server 106. The user can reconnect the KMD 108 to the server 106 or optionally connect the KMD 108 to another server.

In some embodiments, the KMD 108 may include an interface which may be used to connect the KMD 108 to a SED without communications passing through the server or over a network (e.g. via intelligent drive electronics ("IDE"), serial advanced technology attachment ("SATA"), or another interface (e.g. SAS, NVMe, PCIe)). In some examples, the KMD 108 to SED interface may be utilized during registration of the SED with the KMD 108 as discussed above.

Figure 2:
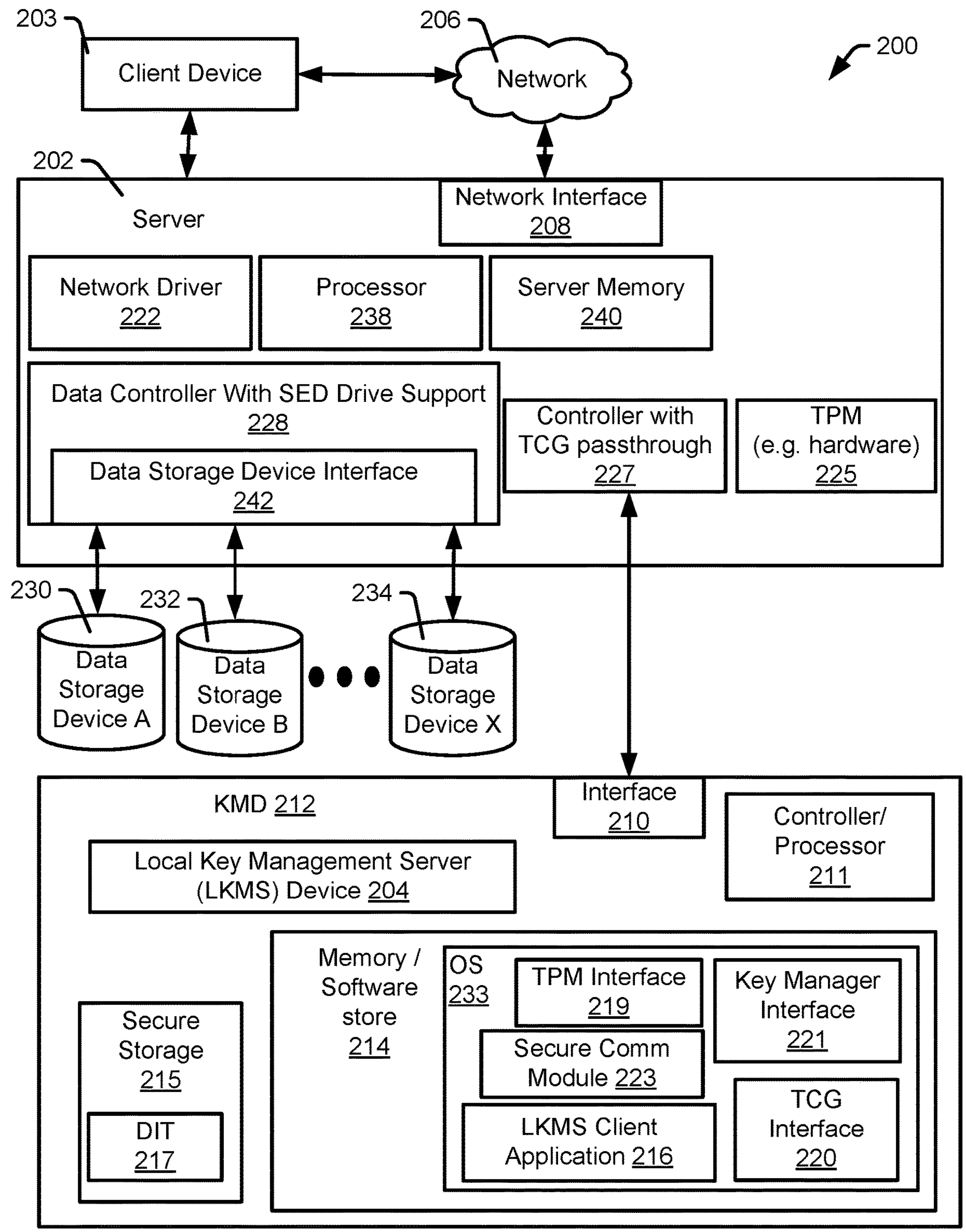
FIG. 2 is a diagram of a system of a removable circuit for unlocking self-encrypting data storage devices, in accordance with certain embodiments of the present disclosure.

Referring to FIG. 2, certain embodiments of a system of a removable circuit for unlocking self-encrypting data storage devices are shown and generally designated 200. The system 200 may be an example of the system 100, according to certain embodiments. The system 200 may have a LKMS 204 that includes a control circuit, software, secure storage area, or any combination thereof to perform the functions described herein.

The server 202 may be coupled to DSD A 230, DSD B 232, and DSD X 234 via data controller 228. In some examples, DSDs A 230, B 232, and X 234 may be SEDs, and may be coupled to the data controller 228 via a DSD interface 242. The DSD interface 242 may be a serial-advanced-technology interface ("SATA"), serial-attached small-computer-system-interface ("SAS"), or other interface. The controller 228 may be a redundant array of independent discs ("RAID") controller or other data storage controller.

The server 202 can also include a server memory 240, network driver 222, processor 238, TPM 225, and a controller 227. In some examples, the processor 238 may be a circuit including one or more processing devices, such as central processing units, microprocessors, or other processors. The controller 227 may be a controller with a trusted computing group ("TCG") standardized passthrough protocols to allow the controller 227 to securely communicate with the KMD 212. In some examples, controller 227 and controller 228 may be combined into a single physical controller device.

The KMD 212 may be a removable data storage device, such as a hard disc drive (HDD) or solid state drive (SDD), connected to the server 202. The KMD 212 may include a non-secure data storage area 214 and a secure data storage area 215, both of which may be non-volatile memory, where secure data storage area 215 can be accessed via the TPM 225. The non-secure data storage area 214 may store an operating system ("OS") 233 that can be loaded into the server memory 240 for execution of the security protocols to unlock, register, or perform other functions on any SEDs connected to the server, or in communication with, the server 202. The OS 233 can be loaded into the memory 240 via the controller 211 providing the OS 233 to the controller 227 for loading into the memory 240.

The secure data storage area 215 can include a drive information table ("DIT") which can store information regarding SEDs managed by the security protocols of the server 202. The secure storage area 215 may be a reserved band or zone of the KMD 212 reserved to store authentication keys, communication keys, and other information corresponding to SEDs connected to the server 202. The secure storage area 215 may be encrypted and may only be accessible by the KMD 212 when the proper key is provided to the KMD 212 by the TPM 225.

Further, OS 233 can include code to implement security protocols or related functions, such as a key manager interface 221, a TCG interface 220, a LKMS client application 216, a TPM interface 219 and a secure communication module 223. The TPM interface 219 can allow the OS 233 to communicate with the TPM 225, which can allow the OS 233 to unlock the secure storage area 215. The key manager interface 221 can allow the OS 233 to communicate with the LKMS 204. The TCG interface 220 can allow the OS 233 to communicate with the KMD 212. The LKMS client application 216 can allow the OS 233 to communicate with a user of the server 202, a client device 203, or another server. The secure communication module 223 may allow the OS 233 to communicate with the DSD A 230, DSD B 232, and DSD X 234 securely using the communication keys corresponding to the DSDs and stored in the secure storage 215.

During operation, the server 202 may be powered on, and the BIOS of the server 202 can be configured to load the operating system 233 from the KMD 212 into the server memory 240 for execution by the processor 238. The operating system 233 can be loaded prior to a native operating system of the server 202 being loaded. Once the OS 233 is finished running its security protocols, such as to unlock or modify security of a band(s) or drive(s), the BIOS may load the native operating system which allows the server 202 to perform its normal functions. The BIOS code and the native operating system code may be stored in a non-volatile memory of the server 202.

Once the OS 233 is loaded into the server memory, the OS code can be executed to connect to the TPM to unlock the secure storage area 215 of the KMD 212. Access to the secure storage area 215 can be gained by utilizing the TPM 225 to generate an access key to unlock the secure storage area 215. Once access to the secure storage area 215 is granted by the TPM 225, the OS 233 may retrieve the DIT 217 and, then or at a later time, an access key for the LKMS 204. In some examples, the DIT 217 can include a list of DSDs connected (physically or communicatively) to the server 202 and can include a registration status (e.g. registered or unregistered) of each DSD, communication keys for use with the DSDs, or other information corresponding to the DSD. Further, the DIT 217 can include a list of protected bands (e.g. zones) on one or more DSDs; and the functions herein can be performed per drive or per band. A protected band may be a reserved portion of the available storage in a DSD. Each DSD may have one or multiple bands for data storage. When referring to security locking or unlocking of SED DSDs herein, a band may be utilized instead of the whole drive.

Once the OS 233 has the DIT 217, the OS 233 can determine if any other drives or bands need to be added to the DIT 217. The OS 233 can also access an encrypted key from the first secure storage area 215 to access the LKMS 204. The LKMS 204 can provide encrypted keys to access drives 230-234 or the bands listed in the DIT 217. The OS 233 can then receive the encrypted key and communication key corresponding to a drive or band. The OS 233 may then utilize the secure communication module 223 to communicate with the corresponding drive using the communication key and unlock the corresponding drive or band utilizing the encrypted key. The OS 233 can then delete the local version of the communication key and the encrypted key used to unlock the drive. Once all the drives are unlocked, the OS 233 may relock the secure storage 215 via the TPM 225 and then hand over control of the server 202 to the BIOS to implement the native operating system.

In some embodiments, whenever an SED is connected or disconnected from the server 202, one or more unique indicators corresponding to the SED may be added or removed from the DIT 217. In some examples, the unique indicators may be manually added or removed from the list by a user, or may be automatically added or removed without any interaction with a user, or a combination thereof may be performed.

When one or more of the DSDs A 230, B 232, and X 234 have not been unlocked, the OS 233 may create an error indicator. In some cases, the OS 233 may create the error indicator when a threshold amount of time has passed since an encrypted key has been sent to a DSD, if an unlocked status indicator has not been received. The error indicator can be stored to a log file and can indicate which of the DSDs were not unlocked. The log file may be stored in the memory 214, server memory 240, secure storage 215, other memory, or any combination thereof.

In some examples, the KMD 212 can include one or more commands stored within the KMD 212 that can be loaded into the memory of the server 202 and run executed by the server 202; the commands could include commands to allow a user to add a drive or band or remove a drive or band from the DIT 217. When a command of the KMD 212 is to be executed, the DIT 217 may be retrieved and compared to the actual physical configuration of the system 202, or any other system the KMD 212 manages, to verify the components of the system. The DIT 217 can be updated based on any changes to the system 202, or an error may be registered if any components cannot be verified. For example, the system can check for drive serial numbers, unique identifiers, encryption keys, or other information to detect if drives are in a different location or have been removed. In some cases, after OS 233 is closed after the KMD 212 setup is finished, the KMD 212 commands can be available to be executed via the server 202 while the server 202 is running the normal OS.

Figure 3:
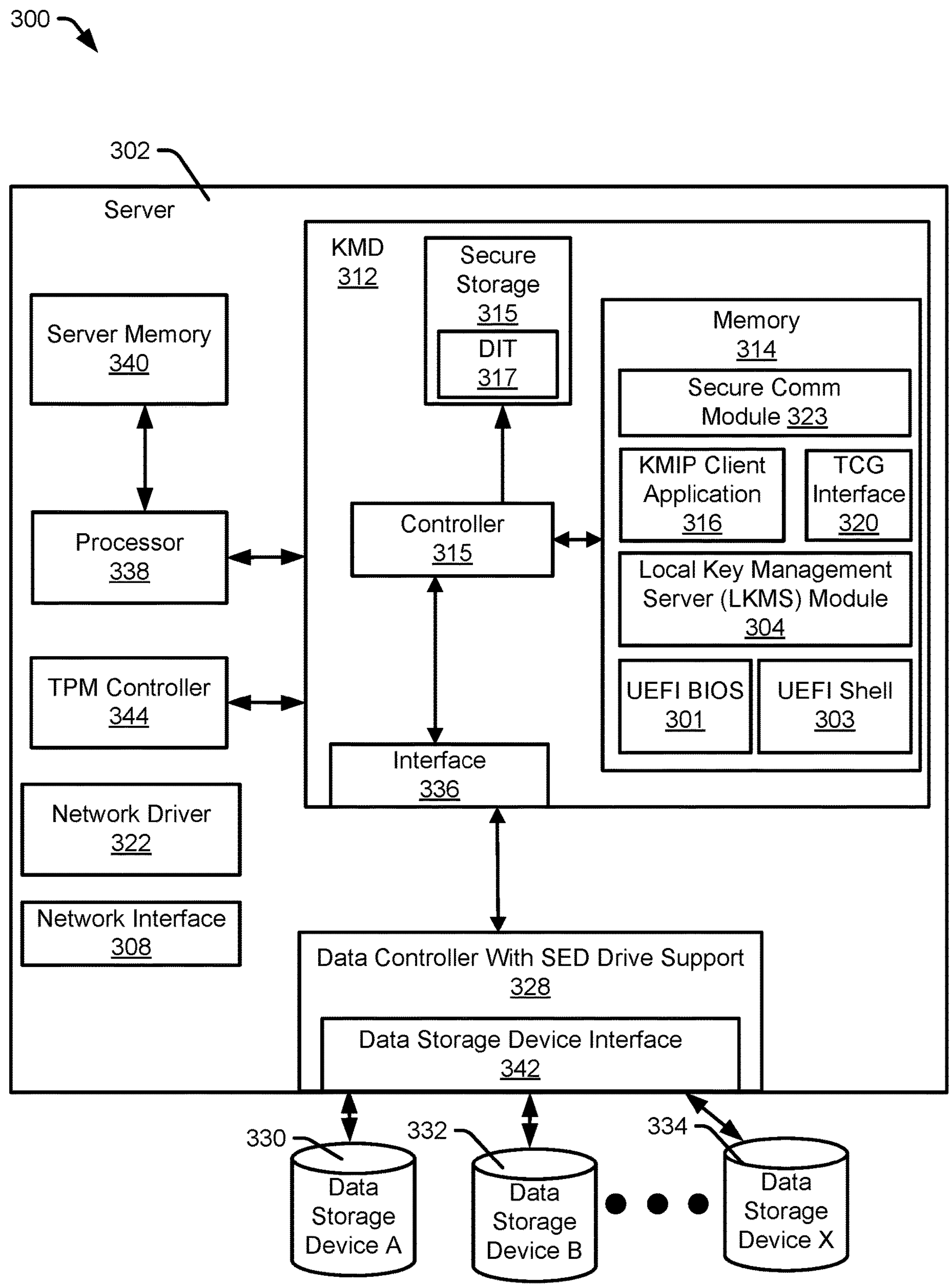
FIG. 3 is a diagram of a system of a removable circuit for unlocking self-encrypting data storage devices, in accordance with certain embodiments of the present disclosure.

Referring to FIG. 3, certain embodiments of a system of a stand-alone removable circuit for unlocking self-encrypting data storage devices are shown and generally designated 300. The system 300 may be an example of the system 100, according to certain embodiments. The system 300 may have a LKMS module 304 that includes a control circuit, software, secure storage area, or any combination thereof to perform the functions described herein.

The server 302 may be coupled to DSD A 330, DSD B 332, and DSD X 334 via data controller 328. In some examples, DSDs A 330, B 332, and X 334 may be SEDs, and may be coupled to the data controller 328 via a DSD interface 342. The DSD interface 342 may be a serial-advanced-technology interface ("SATA"), serial-attached small-computer-system-interface ("SAS"), or other interface. The controller 328 may be a redundant array of independent discs ("RAID") controller or other data storage controller.

The server 302 can also include a server memory 340, network driver 322, processor 338, and TPM controller 344. In some examples, the processor 338 may be a circuit including one or more processing devices, such as central processing units, microprocessors, or other processors. The controller 344 may be a controller with a trusted computing group ("TCG") standardized passthrough protocol(s) to allow the controller 344 to securely communicate with the KMD 312 and to perform TCG operation(s).

The KMD 312 may be a removable data storage device, such as a hard disc drive (HDD) or solid state drive (SDD), connected to the server 302, which, in some examples, may be implemented as a PCIe card. The KMD 312 may include a memory 314 and a secure data storage area 315, both of which may be non-volatile memory, where secure data storage area 315 can be accessed via the TCG interface 320 in conjunction with the TPM controller 344. The memory 314 may store software modules (e.g. functions or commands), such as a unified extensible firmware interface ("UEFI") basic input/output system ("BIOS") module 301 or UEFI registration shell module 303, that can be loaded into the server memory 340 for execution of the functions and commands to unlock, register, or perform other functions on SEDs connected to the server, or in communication with, the server 302. The UEFI BIOS module 301 or UEFI shell module 303 can be loaded into the memory 340 via the controller 315 providing the UEFI BIOS module 301 or UEFI shell module 303 to the processor 338 for loading into the memory 340.

The secure data storage area 315 can include a drive information table ("DIT") which can store information regarding SEDs managed by the security protocols of the server 302. The secure storage area 315 may be a reserved band or zone of the KMD 312 reserved to store authentication keys, communication keys, and other information corresponding to SEDs connected to the server 302. The secure storage area 315 may be encrypted and may only be accessible by the KMD 312 when the proper key is provided to the KMD 312 by the TPM controller 344.

The TCG interface 320 can allow the controller 315 to communicate with the TPM controller 344, which can allow the controller 315 to unlock the secure storage area 315. The key manager interface protocol (KMIP) client application 316 can be loaded into the server memory 340 and executed by the processor 338 to allow the processor 338 to communicate with the LKMS module 304, which may be executed by controller 315 or another controller within the KMD 312. The secure communication module 323 may allow the UEFI BIOS module 301 or UEFI shell module 303 to communicate with the DSD A 330, DSD B 332, and DSD X 334 securely using the communication keys corresponding to the DSDs and stored in the secure storage 315.

During operation, the server 302 may be powered on, and the BIOS of the server 302 can be configured to load the UEFI BIOS 301 from the KMD 312 into the server memory 340 for execution by the processor 338. The UEFI BIOS 301 can be loaded prior to a native operating system of the server 302 being loaded. Once the UEFI BIOS 301 is finished running its security protocols or other functions, such as to unlock or modify security of a band(s) or drive(s), the server BIOS may load the native operating system which allows the server 302 to perform its normal functions. The BIOS code and the native operating system code may be stored in a non-volatile memory of the server.

Once the UEFI BIOS 301 is loaded into the server memory, the UEFI BIOS code can be executed to manage the TPM controller 344 to unlock the secure storage area 315 of the KMD 312. Access to the secure storage area 315 can be gained by utilizing the TPM controller 344 to generate or retrieve an access key to unlock the secure storage area 315. Once access to the secure storage area 315 is granted by the TPM 344, the UEFI BIOS 301 may retrieve the DIT 317 and, then or at a later time, an access key for the LKMS 304. In some examples, the DIT 317 can include a list of DSDs connected (physically or communicatively) to the server 302 and can include a registration status (e.g. registered or unregistered) of each DSD, communication keys for use with the DSDs, or other information corresponding to the DSD. Further, the DIT 317 can include a list of protected bands (e.g. zones) on one or more DSDs; and the functions herein can be performed per drive or per band. A protected band may be a reserved portion of the available storage in a DSD. Each DSD may have one or multiple bands for data storage. When referring to security locking or unlocking of SED DSDs herein, a band may be utilized instead of the whole drive.

Once the UEFI BIOS 301 has the DIT 317, the UEFI BIOS 301 can determine if any other drives or bands need to be added to the DIT 317. The UEFI BIOS 301 can also access an encrypted key from the first secure storage area 315 to access the LKMS 304. The LKMS 304 can provide encrypted keys to access drives 330-334 or the bands listed in the DIT 317. The UEFI BIOS 301 can then receive the encrypted key and communication key corresponding to a drive or band. The UEFI BIOS 301 may then communicate with the corresponding drive using the communication key and unlock the corresponding drive or band utilizing the encrypted key. The UEFI BIOS 301 can then delete the local version (on the server) of the communication key and encrypted key used to unlock the drive. Once all the drives are unlocked, the UEFI BIOS 301 may relock the secure storage 315 via the TPM 344 and then hand over control of the server 302 to the server BIOS to implement the native operating system.

In some embodiments, whenever an SED is connected or disconnected from the server 302, one or more unique indicators corresponding to the SED may be added or removed from the DIT 317. In some examples, the unique indicators may be manually added or removed from the list by a user, or may be automatically added or removed without any interaction with a user, or a combination thereof may be performed.

When one or more of the DSDs A 330, B 332, and X 334 have not been unlocked, the UEFI BIOS 301 may create an error indicator. In some cases, the UEFI BIOS 301 may create the error indicator when a threshold amount of time has passed since an encrypted key has been sent to a DSD, if an unlocked status indicator has not been received. The error indicator can be stored to a log file and can indicate which of the DSDs were not unlocked. The log file may be stored in the memory 314, server memory 340, secure storage 315, other memory, or any combination thereof.

In some examples, the KMD 312 can include UEFI Shell module 303 that can include one or more commands that can be loaded into the server memory 340 and executed by the processor 338; the commands can include commands to allow a user to add a drive or band or remove a drive or band from the DIT 317. When a command of the KMD 312 is to be executed, the DIT 317 may be retrieved and compared to the actual physical configuration of the system 302, or any other system the KMD 312 manages, to verify the components of the system. The DIT 317 can be updated based on changes to the system 302, or an error may be registered if any components cannot be verified. For example, the system can check for drive serial numbers, unique identifiers, encryption keys, or other information to detect if drives are in a different location or have been removed. In some cases, after UEFI BIOS 301 is closed once the KMD 312 setup or bootup process is finished, the KMD 312 commands can be available to be executed via the server 302 while the server 302 is running the native OS of the server.

Figure 4:
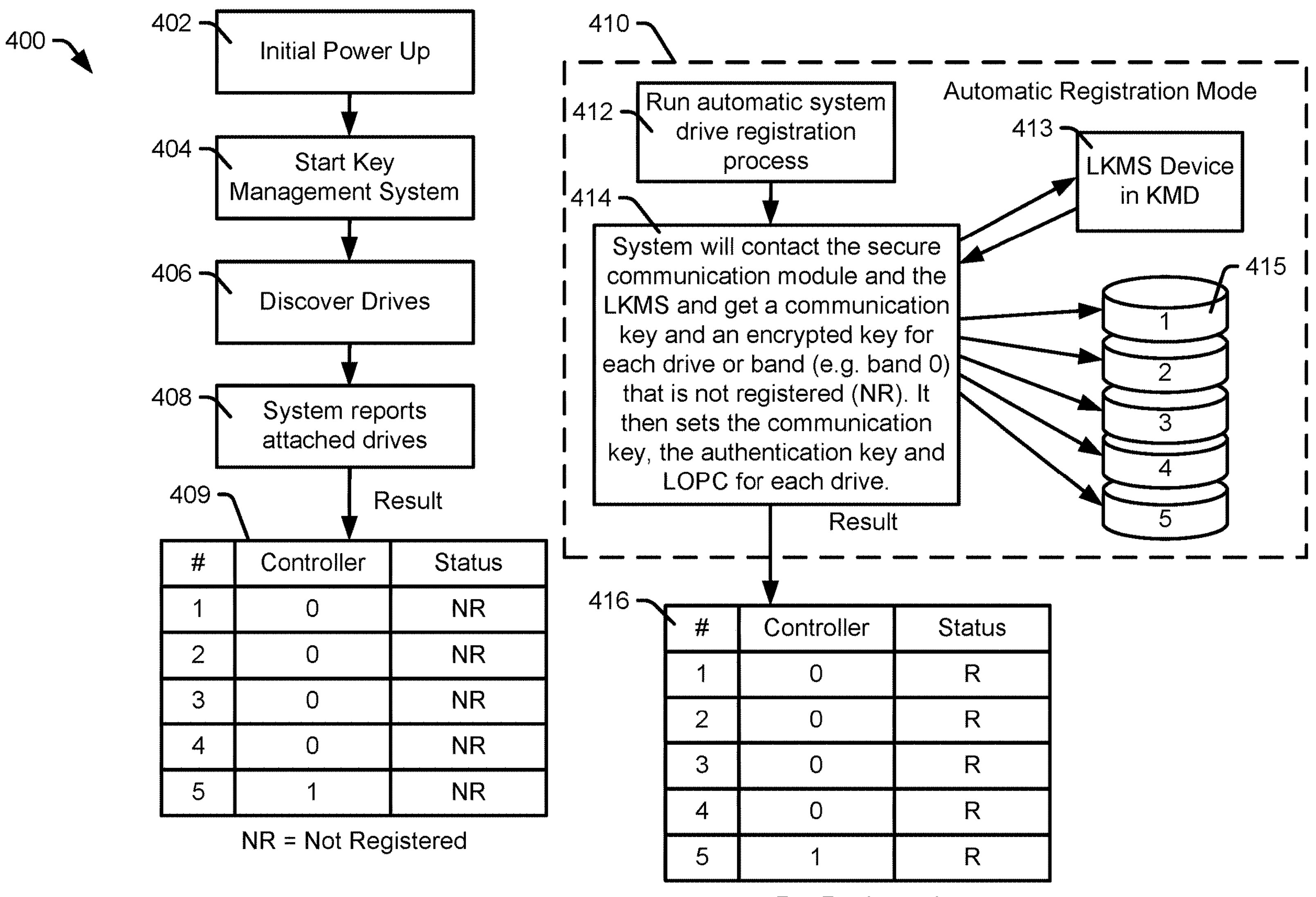
FIG. 4 is a flowchart of a method for unlocking self-encrypting data storage devices, in accordance with certain embodiments of the present disclosure.

Referring to FIG. 4, certain embodiments of a method for unlocking self-encrypting data storage devices with a removable device are shown and generally designated 400. The method 400 may be implemented by the systems 100, 200 and 300, according to certain embodiments. Generally, the method 400 is a general overview of how systems, such as systems 100, 200 and 300, can register DSDs 415, or bands thereof, with a LKMS device 413.

The method 400 may start when a server is initially powered on, at 402. The server may load the key management system (e.g. an OS or UEFI BIOS and UEFI shell) from the KMD to the server, at 404, and discover any SEDs or DSDs connected to the server, at 406. The key management system may report the connected drives to the KMD, at 408. The KMD may store or update the results of the reported drives in a drive information table ("DIT") 409 that may indicate whether the connected drives are registered or not registered. The DIT and updates to the DIT may be stored or updated to the memory. The DIT 409 may also store other information, such as communication keys for registered drives or an indication of which server data storage controller a drive is associated with. If needed, the system can create the DIT 409 if one does not exist. The DIT may be an internal table stored within the KMD that may be accessed via the key management system utilizing security protocols discussed herein.

If there are unregistered drives or bands, the server may implement an automatic registration mode, at 410, to perform an automatic drive registration process, at 412. The automatic registration mode may include the server system contacting the secure communication module and the LKMS 413 to receive a communication key and an encrypted key for each drive or band in the DIT 409 that is not registered, at 414. The automatic registration mode may then install the corresponding communication key, authentication key and lock-on-power-cycle ("LOPC") setting(s) to each drive, at 414. The result of the automatic registration mode can be stored in DIT 409.

A LOPC setting can be a setting within each separate physical drive that indicates a drive is to be locked when a power cycle event occurs, such that once power is restored the drive is locked. The LOPC setting can be done per whole drive, per protected band/zone, or another configuration. Further, the unlocking processes discussed herein may be utilized for a per band unlocking process, where there can be multiple bands per drive. In addition, though the communication keys are described above as being per drive, in some embodiments, the communication keys may be per drive, per band, or a mix thereof.

Figure 5:
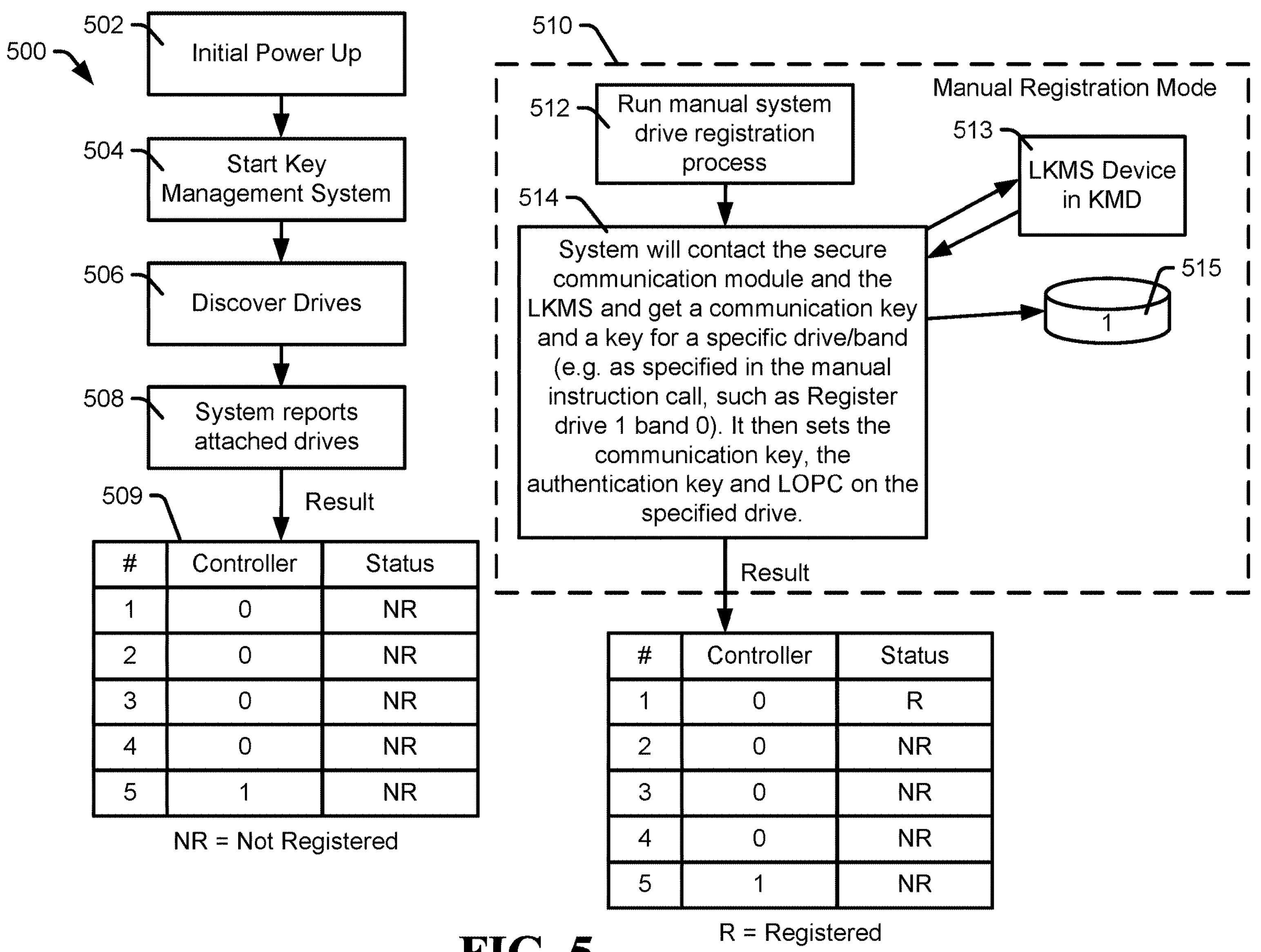
FIG. 5 is a flowchart of a method for unlocking self-encrypting data storage devices, in accordance with certain embodiments of the present disclosure.

Referring to FIG. 5, certain embodiments of a method for unlocking self-encrypting data storage devices with a removable device are shown and generally designated 500. The method 500 may be implemented by the systems 100, 200 and 300, according to certain embodiments. Generally, the method 500 is a general overview of how systems, such as systems 100, 200 and 300, can register one or more DSDs 515, or bands, with a LKMS device 513.

The method 500 may start when a server is initially powered on, at 502. The server may load the key management system (e.g. an OS or UEFI BIOS and UEFI shell) from the KMD to the server, at 504, and discover any SEDs or DSDs connected to the server, at 506. The key management system may report the connected drives to the KMD, at 508. The KMD may store or update the results of the reported drives in a drive information table ("DIT") 509 that may indicate whether the connected drives, or bands thereof, are registered or not registered. The DIT and updates to the DIT may be stored or updated to the memory. The DIT 509 may also store other information, such as communication keys for registered drives or an indication of which server data storage controller a drive is associated with. If needed, the system can create the DIT 509 if one does not exist.

If there are unregistered drives or bands, the server may implement a manual registration mode, at 510, to perform a manual drive registration process, at 512. The manual registration mode may be initiated by a user or client of the server indicating a specific unregistered DSD or band in the DIT 509 should be registered. The server system can then contact the secure communication module and the LKMS 513 to receive a communication key and an encrypted key for the indicated drive or band, at 514. The manual registration mode may then install the corresponding communication key, authentication key and lock-on-power-cycle ("LOPC") setting(s) to the specific drive or band, at 514. The result of the manual registration mode can be stored in DIT 509.

Figure 6:
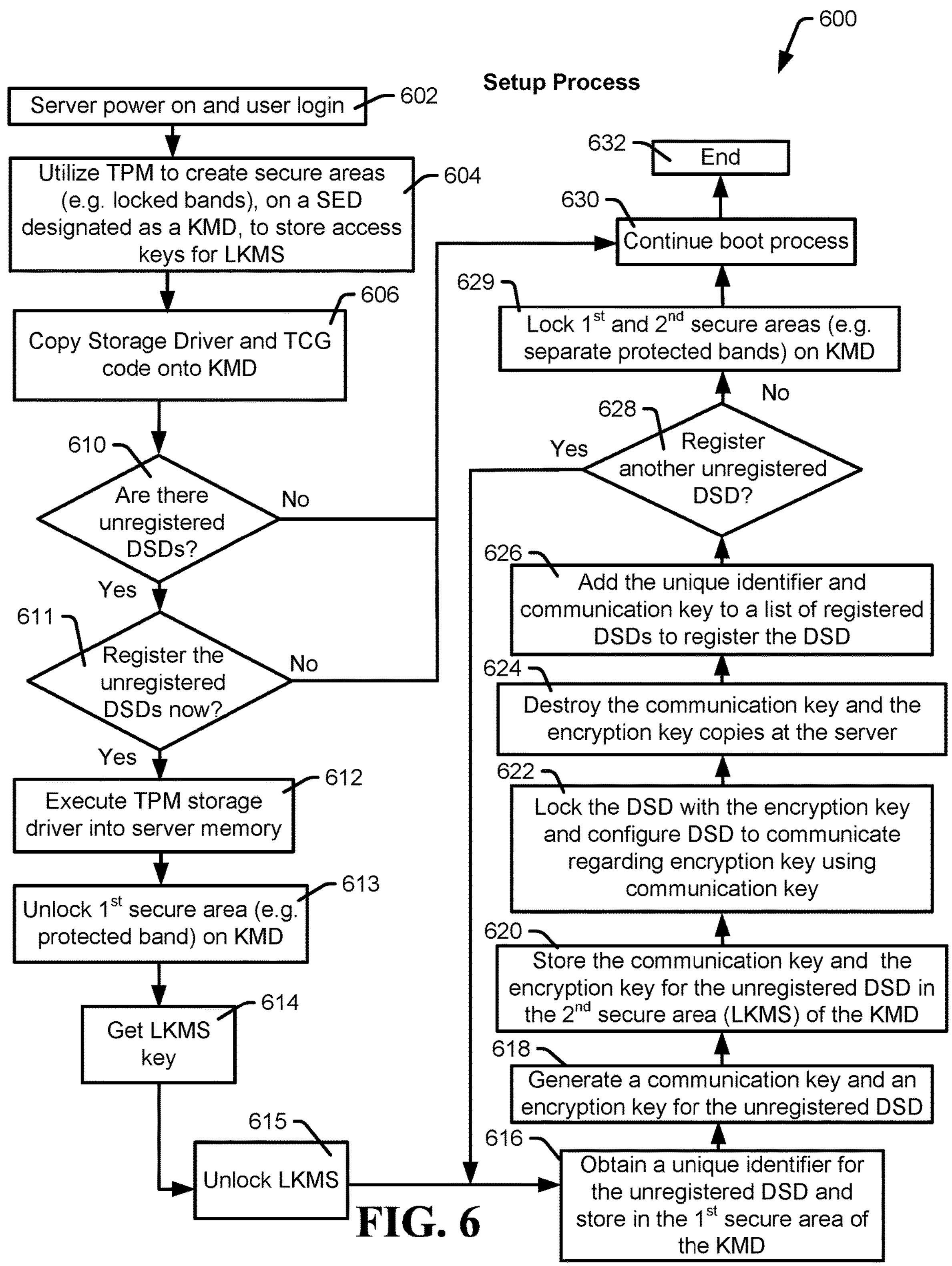
FIG. 6 is a flowchart of a method for unlocking self-encrypting data storage devices, in accordance with certain embodiments of the present disclosure.

Referring to FIG. 6, certain embodiments of a method for unlocking self-encrypting data storage devices with a removable circuit are shown and generally designated 600. The method 600 may be implemented by the systems 100 and 200, according to certain embodiments. The method 600 can initialize systems 100 and 200 and register DSDs with a LKMS device.

The method 600 can start when a server is powered on, at 602. Once the server is running, the TPM may be utilized to create a secure storage area, such as a locked band, on a specific data storage device (e.g. SSD or HDD) designated as a KMD, at 604. The secure storage area can be utilized to store a DIT and other access keys. In some embodiments in which public/private key pairs are used by the secure communication module, a certificate authority may be contacted to obtain a public/private key pair and certificate for the KMD.

The method 600 may include copying an OS and associated code for the TPM interface, the LKMS client application, the key manager interface, and the TCG interface onto the KMD, at 606. In some examples, the TPM interface, the LKMS client application, the key manager interface, or the TCG interface may be downloaded from a server via a network interface and stored to the KMD. When the OS and associated code(s) are already on the KMD and no updates are to be made, step 606 may be bypassed.

Once the OS and associated codes are stored in the KMD, the method 600 can include determining if there are any unregistered DSDs or bands connected to the server, at 610. When there are no unregistered DSDs or bands in the table, the process may continue with the normal boot process, at 630, or can end at 632.

In some embodiments, unregistered DSDs or bands may be determined automatically by polling DSDs attached to the server and comparing their unique identifiers to a list of registered devices stored in a memory. When unique identifiers obtained from the DSDs are not in the list of registered devices, those DSDs or bands may be registered. In some cases, a user may determine that there are unregistered DSDs or bands coupled to the server. For example, when a user connects a DSD to the server via a DSD interface, the DSD, and bands thereof, may be unregistered.

When there are unregistered DSDs or bands attached to the server, the method 600 can include determining if any of the unregistered DSDs or bands should be registered, at 611. When one or more unregistered DSDs are to be registered, the method 600 can include loading a TPM storage interface into memory, at 612, and unlocking a secure area of the KMD that stores a LKMS key, at 613, which can be retrieved from the first secure storage area, at 614. Utilizing the OS and the LKMS key, the method 600 can then unlock a second secure storage area that can store access keys associated with a DIT, at 615.

The method 600 may then obtain a unique identifier (e.g. serial number, or other identifier) for the unregistered DSD and store the unique identifier in the secure storage area of the KMD, at 616. The KMD may send a command to the DSD requesting the unique identifier to obtain the unique identifier.

The KMD may then generate a communication key and an encrypted key corresponding to the unique identifier, at 618. The method 600 can include storing the communication key and the encrypted key in the secure storage area, at 620. Once the communication key and the encrypted key have been stored in the secure storage area, the method 600 can include locking the DSD or band corresponding to the unique identifier with the encrypted key and configuring the DSD to communicate regarding the encrypted key using the communication key, at 622. In some embodiments, the KMD may, using the communication key for encryption, send a TCG command and the encrypted key to the DSD with instructions to lock the DSD or band with the encrypted key. A TCG command may be a command that conforms to TCG protocols. The TCG command and the encrypted key can be transmitted to the DSD via a TCG interface. The command can include a request for an indicator to indicate if the lock operation was successful. If the lock operation was not successful, the command may be resent, aborted, or suspended pending action from the user. Similar commands may be performed for the communication key configuration. Also, an error message may be displayed and the error logged. The log can be stored to the KMD or another memory. In some embodiments in which the secure communication module may utilize a pre-shared key, the pre-shared key may be generated randomly using, for example, a time, a unique identifier of the DSD and a unique identifier of the KMD. In some embodiments in which public/private key pairs may be used by the secure communication module, a certificate authority may be contacted to obtain a public/private key pair and certificate for the DSD.

When the lock operation and communication configuration operation were successful, the local version of the communication key and the encrypted key at the OS can be destroyed, at 624. For example, the communication key and the encrypted key may be erased from the memory in which it was stored for access by the OS. The unique identifier and the communication key may be added to a list of registered DSDs, such as a DIT, at 626. Once the unique identifier and the communication key are added to the list of registered DSDs, the DSD can be considered registered and the successful lock operation can be store in the log.

The method 600 can include determining if there are other unregistered DSDs to register, at 628. This could be done automatically or done manually via user input. For example, unregistered DSDs may be determined automatically by polling DSDs attached to the server and comparing their unique identifiers to a list of registered devices stored in a memory. When there are more unregistered DSDs to register, the method 600 can repeat steps starting at 616. When there are no more unregistered DSDs to register, the method 600 can include locking the secure storage areas, at 629. Then, the method 600 may continue the boot process, at 630. In some examples, the boot process may include detecting or initializing other hardware components, loading applications into a memory, loading a native operating system into memory, other tasks, or any combination thereof. The method 600 can end, at 632.

One or more steps in the method 600 may be optional. For example, in certain embodiments, the steps 606 and 612 may be removed. Further, some ordering in which the steps are executed in the method 600 may be changed.

Figure 7:
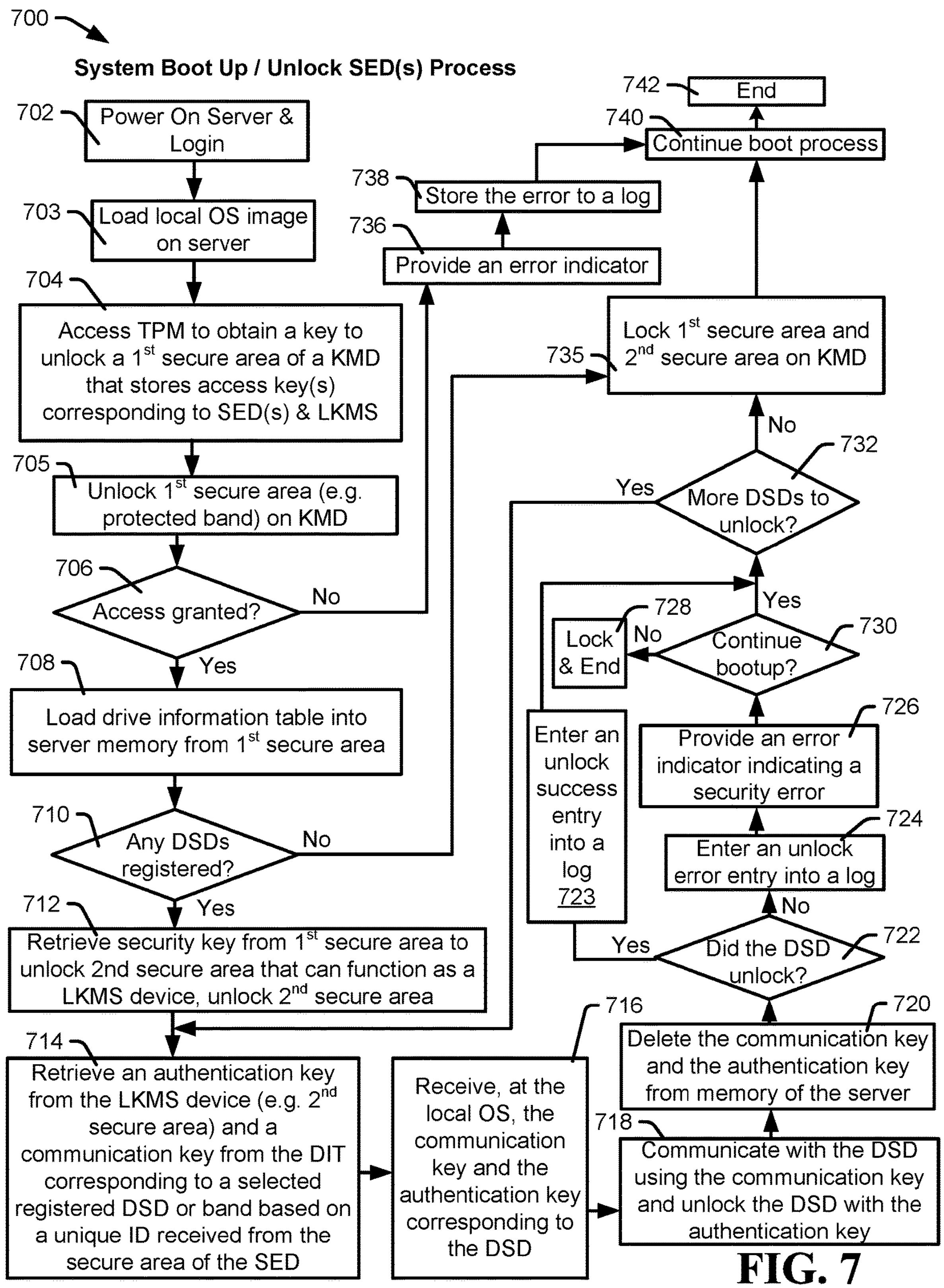
FIG. 7 is a flowchart of a method for unlocking self-encrypting data storage devices, in accordance with certain embodiments of the present disclosure.

Referring to FIG. 7, certain embodiments of a method for unlocking self-encrypting data storage devices with a removable circuit are shown and generally designated 700. The method 700 may be implemented by the systems 100 and 200, according to certain embodiments. The method 700 can unlock DSDs using encrypted keys obtained from a LKMS.

The method 700 can include powering on a server, at 702, and having the server's BIOS load a special operating system ("OS") into memory of the server, at 703. The special OS may be configured to perform the security functions and communications herein and may be stored on a KMD. The method 700 may also include accessing a TPM within the server to obtain a key to unlock a secure area of the KMD that stores access key(s) (e.g. certificates) corresponding to SED(s), at 704. The secure area of the KMD may also store information to access a LKMS. Once the OS has access to TPM, the OS may utilize the TPM to unlock the first secure area on the KMD, at 705. If the TPM does not grant access to the secure area, the process may provide an error indicator, at 736, store the error to a log file, at 738, and may continue the boot process without unlocking any SEDs, at 740.

When access to the secure area of the KMD is granted, the OS may load the drive information table ("DIT") into the server memory, at 708, and the OS can determine if there are any DSDs or bands registered in the DIT, at 710. In some cases, unique identifiers obtained from connected DSDs can be compared against the list of registered DSDs to determine if there are any DSDs or bands in the DIT. If there are no DSDs registered in the DIT, the process may relock the secure areas of the KMD, at 735, and may continue with the boot process without unlocking any SEDs, at 740. However, if there are DSDs registered in the DIT, the process may continue.

When at least one of the unique identifiers obtained from the DSDs coupled to the server corresponds to a unique identifier in the list of registered DSDs, the method 700 can include retrieving a security key from the first secure area to unlock a second secure area that can function as a LKMS device, and then unlocking the second secure area, at 712. Once the second secure area is unlocked, the method 700 can include retrieving a security key (e.g. encrypted key) and a communication key from the secure storage area corresponding to a selected registered DSD or band, at 714, by its unique stored ID.

The method 700 can include receiving the communication key and the encrypted key corresponding to the selected unique identifier from the LKMS, at 716. When the communication key and the encrypted key are received, the communication key and the encrypted key may be stored to a memory. If the communication key and the encrypted key are not received, a DSD corresponding to the encrypted key will not be unlocked, and an error message can be reported or logged.

Using the communication key for communications with the DSD, the registered DSD or band corresponding to the communication key, the encrypted key and the selected unique identifier may be unlocked by the encrypted key, at 718. The OS may also delete the local version of the communication key and the encrypted key from the memory, at 720. In some embodiments, an area of the memory in which the encrypted key was stored may be overwritten with data patterns, such as a pattern of 0's or 1's, to erase the security key from the memory. Further, other secure ways of deleting an encrypted key may be utilized.

The method 700 can include determining if the DSD was successfully unlocked, at 722. In some examples, the OS can determine if the DSD was successfully unlocked based on the DSD's response to the unlock command. For example, a DSD can transmit a successful return indicator to the OS when the unlock command was successfully executed, and a non-successful return indicator to the OS when the unlock command was not successfully executed.

The success or failure of each DSD to unlock may be logged. For example, when the DSD was successfully unlocked, an entry indicating the DSD was successfully unlocked may be entered into a log, at 723, and the method 700 can include determining if there are more DSDs to unlock, at 732. In some embodiments, the log may be stored in the KMD, in a server memory, in a portable memory, in another memory, or any combination thereof. When the DSD was not successfully unlocked, the method 700 can include entering an entry indicating the DSD was not successfully unlocked into a log of errors, at 724, and providing an error indicator indicating a security error, at 726.

In some embodiments, the method 700 may include providing the OS or a user with an option to stop the server's bootup process in response to a security error, at 730. When the process is elected to be stopped, the bootup process and the method 700 can end, at 728. In some examples, the user may not be provided with an option to continue or stop the bootup process, at 730; rather, the method 700 may automatically end, at 728, determine if there are other DSDs to unlock, at 732, or perform other operations. If the bootup process is ended, at 728, the method 700 can also lock the secure area on the KMD, at 728.

When the bootup process continues, the method 700 can include determining if there are any other registered DSDs or bands to unlock, at 732. In some embodiments, the OS can compare the unique identifiers obtained from the attached DSDs against a list of registered DSDs. If another of the unique identifiers obtained from the attached DSDs corresponds to a unique identifier from the list of registered DSDs, a communication key and an encrypted key corresponding to another selected unique identifier may be retrieved from the second encrypted area, at 714, and the process can continue as described above. Further, the OS can determine when there are no more registered DSDs to unlock by requesting a registration status, an encrypted status, or both, from the attached DSDs. For example, a command may be sent to each of the attached DSDs to determine if any of the DSDs are still locked, or do not correspond to any unique identifier in the list of registered DSDs.

When all of the DSDs are unlocked, the method 700 can lock the secure areas on the KMD, at 735, and proceed to continue a boot process, at 740. When some of the DSDs are still locked or are not in the list of registered DSDs, the method 700 can lock the secure areas of the KMD, at 735, and then continue with the boot process, at 740.

In some systems, multiple encrypted keys may be obtained from the second secure area at a same time, or in response to a single request. For example, multiple unique identifies from the list of registered DSDs may be utilized in a single request to retrieve encrypted keys, and the LKMS may provide corresponding encrypted keys in a single response.

In some embodiments, an order in which the steps in the method 700 may be changed. For example, in certain embodiments, operation 726 may occur prior to operation 724, or operation 720 may occur after operation 722.

In some embodiments in which public/private key pairs are used by the secure communication module for the communication with the DSDs regarding unlocking the DSDs or bands thereof, a symmetric key may be generated by the OS using the public key of the DSD and the private key of the KMD and the DSD may generate a symmetric key using the private key of the DSD and the public key of the KMD instead of using the public keys alone. Other similar operations may be used.

Figure 8:
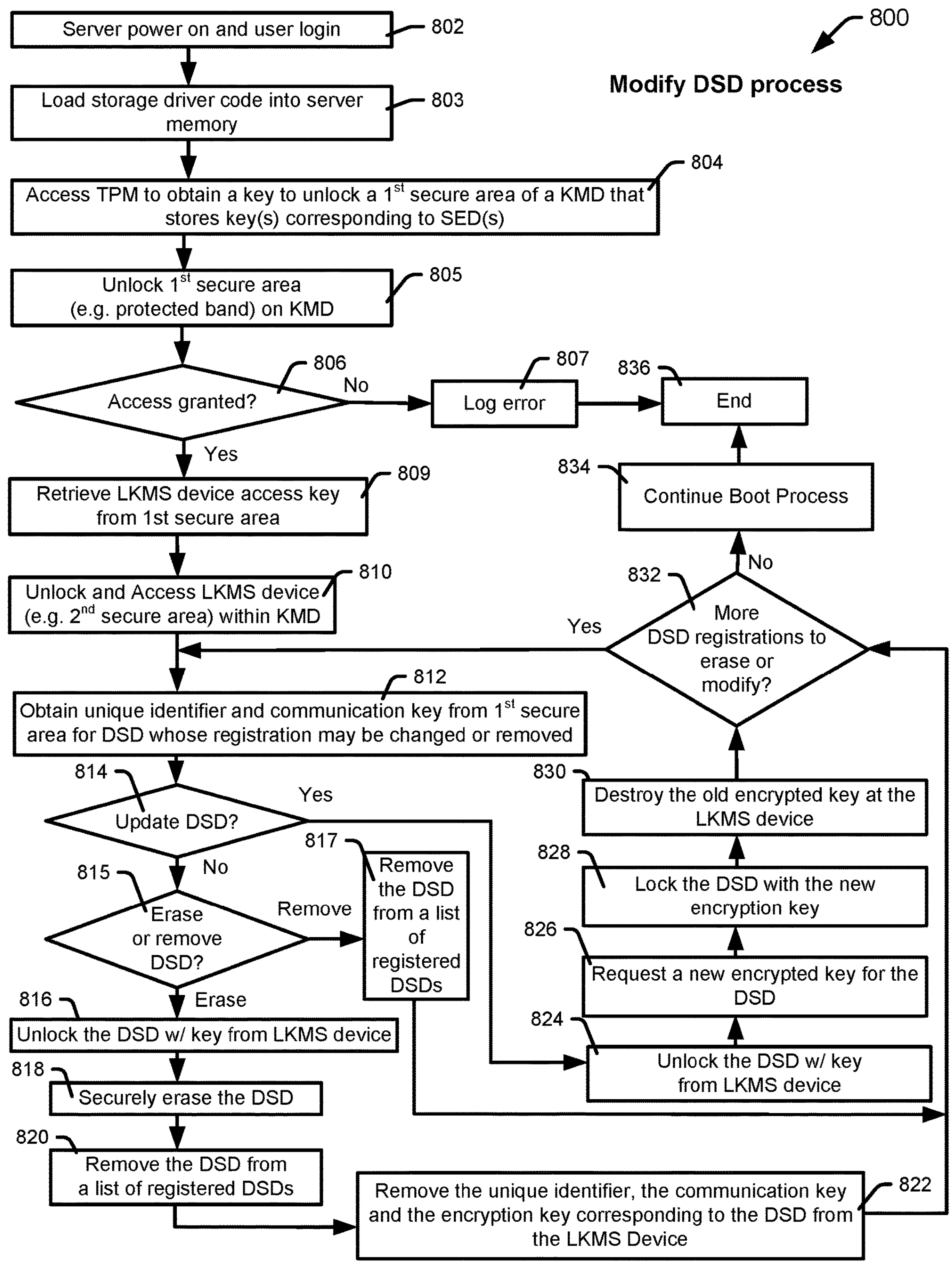
FIG. 8 is a flowchart of a method for unlocking self-encrypting data storage devices, in accordance with certain embodiments of the present disclosure.

Referring to FIG. 8, certain embodiments of a method for unlocking self-encrypting data storage devices with a removable circuit are shown and generally designated 800. The method 800 may be implemented by the systems 100 and 200, according to certain embodiments. The method 800 can delete or modify DSD registration.

The method 800 can include powering on a server, at 802, and loading storage driver code, such as an operating system, into the server's memory, at 803. In some embodiments, a modified OS stored within a KMD can be loaded to run on the server and perform security operations to allow the KMD and server to perform the functions herein. The OS can interface with a TPM to provide access to a secure storage area of a KMD by obtaining a key to unlock the first secure area, at 804, which can stores key(s) or information (e.g. unique IDs) corresponding to SED(s). The method can attempt to unlock the secure area via the TPM, at 805, and determine if access was granted, at 806. If access was not granted, the method may log an error, at 807, and stop, at 836.

If access was granted, the method 800 may retrieve an LKMS device access key from the first secure storage area, at 809, then unlock and access the second secure storage area of the KMD, at 810. The method may also obtain a unique identifier and a communication key for a DSD whose registration may be changed or removed, at 812, such as from a DIT stored in the first secure storage area. In some examples, the KMD or other memory may include a list of DSDs to be unregistered and a list of DSDs whose registration may be changed or updated, and the KMD can select the unique identifier from the lists. The KMD can compare a DSD's unique identifier against a list of DSDs to be unregistered and a list of DSDs whose registration may change or need updating.

The method 800 can include determining if the selected DSD may be updated, at 814. When the selected DSD is to be updated, the method may use the communication key to communicate with and unlock the DSD, at 824, determine a new encrypted key for the DSD, such as described with respect to FIG. 15 or any key generation circuit or function, at 826, receive and lock the DSD with the new encrypted key, at 828, and destroy the old encrypted key at the second secure storage area, at 830. In some embodiments, the communication key may be updated in a similar fashion. The method may then determine if more DSDs need erasing or updating, at 832. When there are no more DSD registrations to change or remove, the method 800 can include continuing the boot process, at 834, and ending, at 836.

The method 800 can include determining if the DSD to be unregistered can be erased, at 815. In some circumstances, a DSD can be removed without securely erasing the data. In some examples, an erase indicator corresponding to the DSD may be included in the list of DSDs. When the DSD is to be removed (and not erased), the method 800 can include removing the DSD from a list of registered DSDs, at 817, and determining if there are more DSD registrations to erase or modify, at 832.

When the DSD is to be erased, the method 800 can include, using the communication key to communicate with the DSD, unlocking the DSD, at 816. The method 800 can include securely erasing the unlocked DSD, at 818. In some embodiments, the DSD may be cryptographically erased. When a DSD is cryptographically erased, an encryption key protecting data of the DSD may be changed, and all record of the encryption key may be destroyed. Thus, any data encrypted by such key on the DSD may not be accessible. In some examples, the DSD may be physically erased using write patterns to continually overwrite the DSD, or a portion thereof, until no physical traces of useful data exist. In some embodiments, the communication key may be removed or changed in a similar fashion.

Once the DSD has been securely erased, the method 800 can include removing the DSD from a list of registered DSDs, at 820. The list of registered DSDs may be accessed and the unique identifier corresponding to the securely erased DSD may be removed.

The method 800 can then include initiating the LKMS to remove (e.g. delete, erase) the unique identifier, the communication key and the encrypted key corresponding to the DSD from the second secure storage area, at 822. The LKMS device may delete the encryption key from the second secure storage area.

The method 800 can include determining if there are more DSDs to be unregistered or DSDs whose registration may be changed, at 832. The method may determine if there are any more DSDs in the list of DSDs to unregister and the list of DSDs whose registration may be changed to determine if there are DSDs that have not yet been selected. When there are no more DSD registrations to change or DSDs to erase or remove, the method 800 can include continuing a boot process, at 834, and ending, at 836.

When there are more DSD registrations to change or DSDs to update, erase, or remove, the method 800 may repeat one or more of the steps.

One or more steps in the method 800 may be optional. Further, in some examples, an order in which steps in the method 800 are executed may change. For example, step 822 may be executed before step 820.

Figure 9:
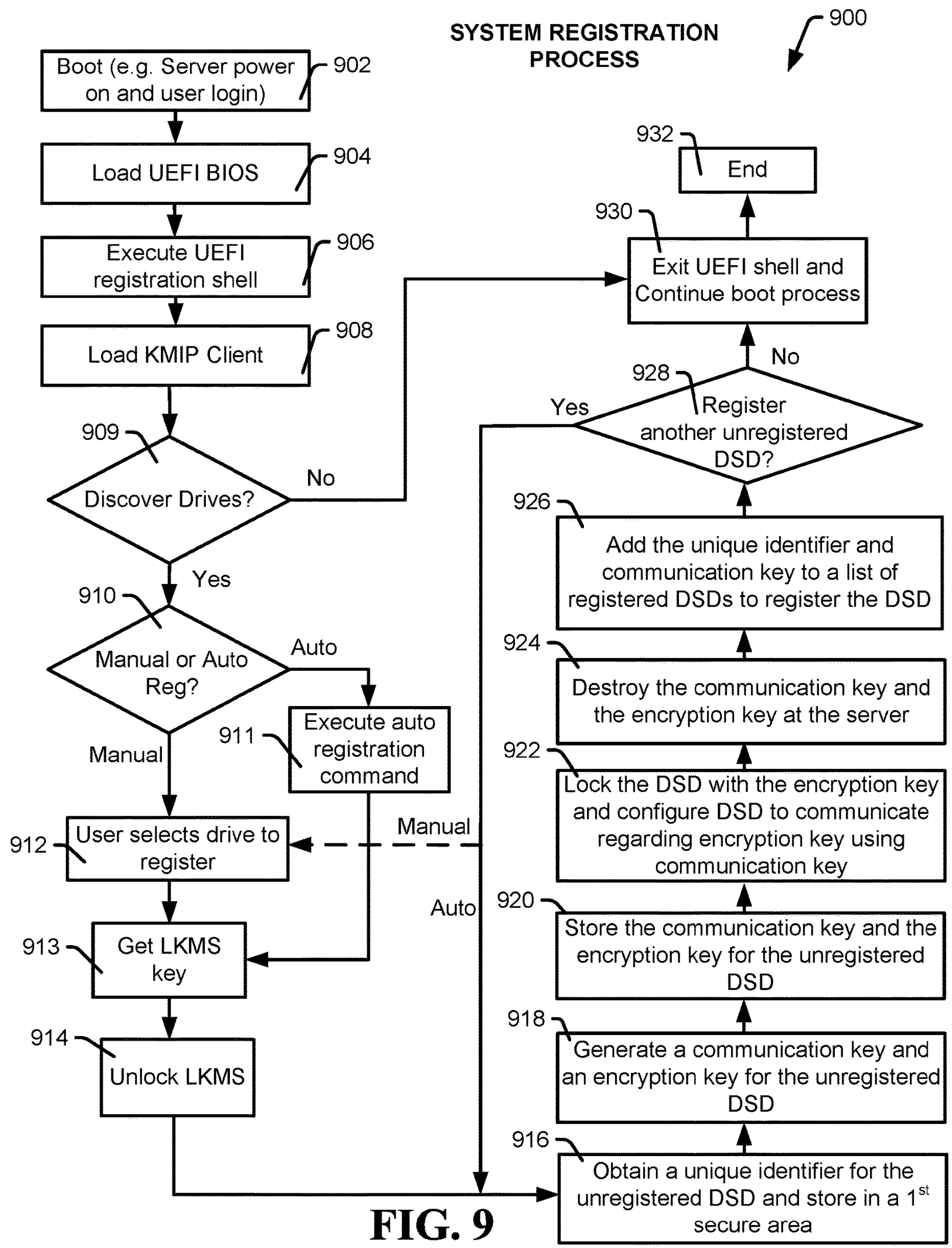
FIG. 9 is a flowchart of a method for unlocking self-encrypting data storage devices, in accordance with certain embodiments of the present disclosure.

Referring to FIG. 9, certain embodiments of a method for unlocking stand-alone self-encrypting data storage devices with a removable circuit are shown and generally designated 900. The method 900 may be implemented by the systems 100 and 300, according to certain embodiments. The method 900 can initialize systems 100 and 300 and register DSDs with a LKMS device.

The method 900 can start when a server is powered on, at 902. Once the server is running, the server BIOS may load the UEFI BIOS from the KMD into the server memory, at 904, to allows functions for SEDs to be executed. When SEDs are to be registered, the UEFI BIOS can load and execute the UEFI registration shell, at 906, which may be a set of commands and functions that allow registration or deregistration of an SED. Registered means the SED, or a band thereof, is listed in a DIT of the KMD and has an associated encryption key managed by the LKMS to allow unlocking of the SED or band. A deregistered or unregistered SED, or a band thereof, may be listed in a DIT of the KMD but may not have an encryption key associated with it. If needed, the TPM may be utilized to create a secure storage area, such as a locked band, on a specific data storage device (e.g. SSD or HDD) designated as a KMD. The secure storage area can be utilized to store the DIT and other access keys. In some embodiments in which public/private key pairs are used by the secure communication module, a certificate authority may be contacted to obtain a public/private key pair and certificate for the KMD. The KMIP client application may be loaded and executed, at 908, to allow the host processor to communicate with the LKMS module.

Once the UEFI BIOS and UEFI registration shell are loaded in the host memory, the method 900 can discover any drives or bands attached (directly or via network protocols) to the server and determine if there are any unregistered DSDs or bands connected, at 909. When there are no unregistered DSDs or bands that are to be registered, the process may exit the UEFI shell and UEFI BIOS and continue with the normal boot process, at 930, or can end at 932.

In some embodiments, unregistered DSDs or bands may be determined automatically by polling DSDs attached to the server and comparing their unique identifiers to a list of registered devices stored in a memory. When unique identifiers obtained from the DSDs are not in the list of registered devices, those DSDs or bands may be registered. In some cases, a user may determine that there are unregistered DSDs or bands coupled to the server. For example, when a user connects a DSD to the server via a DSD interface, the DSD, and bands thereof, may be unregistered.

When there are unregistered DSDs or bands attached to the server, the method 900 can include selecting whether an automatic registration mode or a manual registration mode should be used, at 910. When a manual registration mode is used, the process 900 can include allowing an operator or user of the server to select which drive(s) or band(s) to register, at 912, which may be done one at a time or multiple selected as a group, via the UEFI registration shell. When an automatic registration mode is utilized, the process 900 may execute an automatic registration command via the UEFI registration shell, at 911. The UEFI registration shell may provide the user or server a graphical user interface or programming interface to allow any selections to be made.

When one or more unregistered DSDs are to be registered, the method 900 can include loading a TPM storage interface into memory and unlocking a secure area of the KMD that stores a LKMS key, at 913, which can be retrieved from the first secure storage area. Utilizing the UEFI BIOS and the LKMS key, the method 900 can then unlock a second secure storage area that can store access keys associated with a DIT, at 914.

The method 900 may then obtain a unique identifier (e.g. serial number, or other identifier) for the unregistered DSD and store the unique identifier in the secure storage area of the KMD, at 916. The KMD may send a command to the respective SED requesting the unique identifier from the respective KED In some examples, the UEFI Bios via the server controller may send the command(s) to the respective SED.

The KMD may then generate a communication key and an encrypted key corresponding to the unique identifier, at 918. The method 900 can include storing the communication key and the encrypted key in the secure storage area, at 920. Once the communication key and the encrypted key has been stored in the secure storage area, the method 900 can include locking the DSD or band corresponding to the unique identifier with the encrypted key and configuring the DSD to communicate regarding the encrypted key using the communication key, at 922, which may be performed by the UEFI BIOS operating on the server. In some embodiments, the KMD may send a TCG command and the encrypted key to the SED with instructions to lock the SED or band with the encrypted key. A TCG command may be a command that conforms to trusted computing group (TCG) standardized protocols. The TCG command and the encrypted key can be transmitted to the DSD via a TCG interface. The command can include a request for an indicator to indicate if the lock operation was successful. If the lock operation was not successful, the command may be resent, aborted, or suspended pending action from the user. Similar commands may be performed for the communication key configuration. Also, an error message may be displayed and the error logged. The log can be stored to the KMD or another memory. In some embodiments in which the secure communication module utilizes a pre-shared key, the pre-shared key may be generated randomly using, for example, a time, a unique identifier of the DSD and a unique identifier of the KMD. In some embodiments in which public/private key pairs are used by the secure communication module, a certificate authority may be contacted to obtain a public/private key pair and certificate for the DSD.

When the lock operation and communication configuration operation were successful, the local version of the communication key and the encrypted key at the UEFI BIOS can be destroyed, at 924. For example, the communication key and the encrypted key may be erased from the memory in which it was stored for access by the UEFI BIOS. The unique identifier and the communication key may be added to a list of registered DSDs, such as a DIT, at 926. Once the unique identifier and the communication key are added to the list of registered DSDs, the DSD can be considered registered and the successful lock operation can be store in the log.

The method 900 can include determining if there are other unregistered DSDs to register, at 928. This could be done automatically or done manually via user input. For example, unregistered DSDs may be determined automatically by polling DSDs attached to the server and comparing their unique identifiers to a list of registered devices stored in a memory. When there are more unregistered DSDs to register and the automatic registration mode has been implemented, the method 900 can repeat steps starting at 916. If the manual registration mode has been implemented, the method 900 may repeat steps starting at 912. Once all selected DSD have been registered, the method 900 may continue the boot process, at 930. In some examples, the boot process may include detecting or initializing other hardware components, loading applications into a memory, loading a native operating system into memory, other tasks, or any combination thereof. The method 900 can end once the UEFI BIOS hands over control of the server to the normal boot process, at 932.

One or more steps in the method 900 may be optional. For example, in certain embodiments, the step 910 may be removed and only one of the registration mode options implemented. Further, some ordering in which the steps are executed in the method 900 may be changed.

Figure 10:
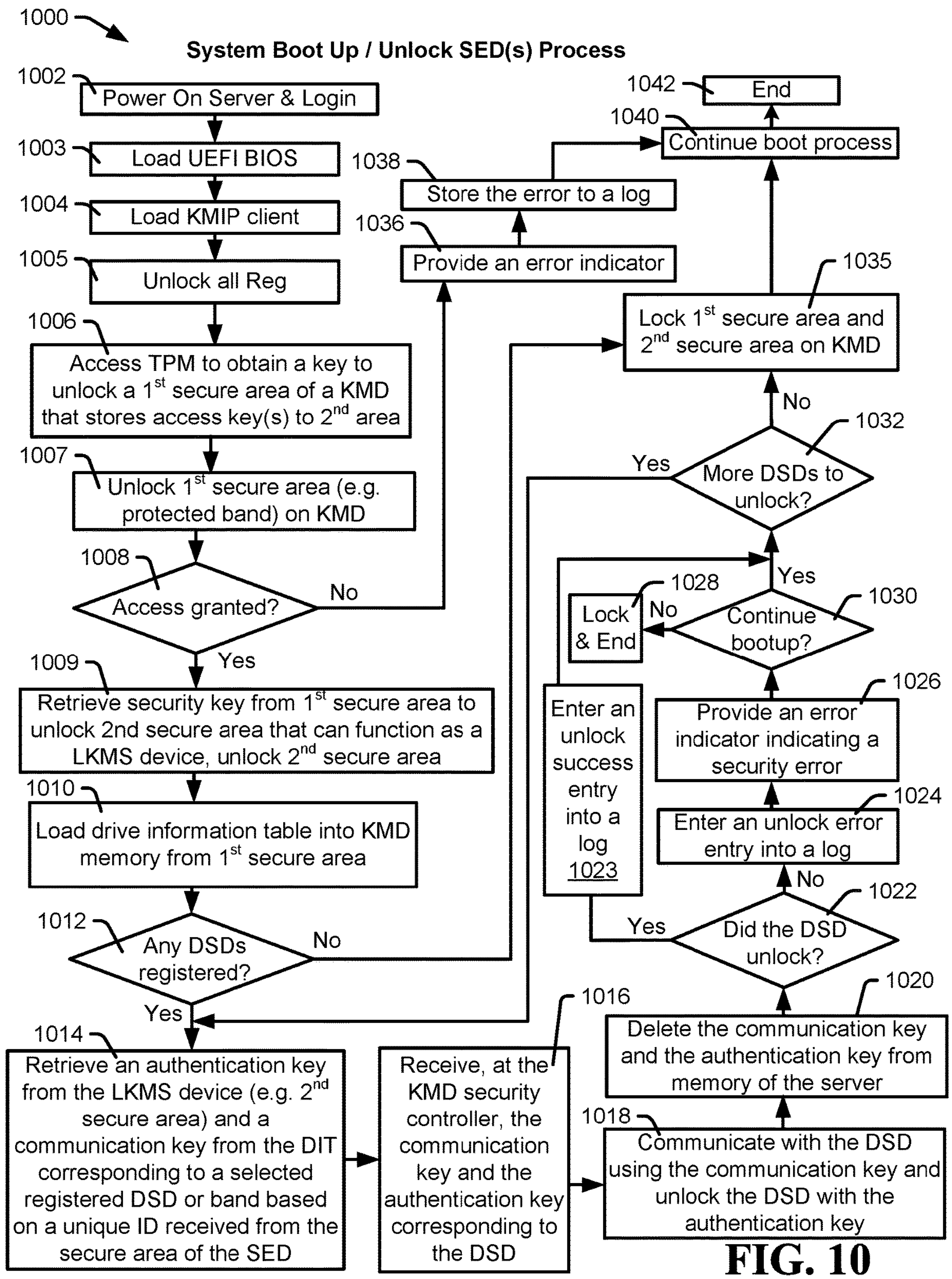
FIG. 10 is a flowchart of a method for unlocking self-encrypting data storage devices, in accordance with certain embodiments of the present disclosure.

Referring to FIG. 10, certain embodiments of a method for unlocking stand-alone self-encrypting data storage devices with a removable circuit are shown and generally designated 1000. The method 1000 may be implemented by the systems 100 and 300, according to certain embodiments. The method 1000 can unlock DSDs using encrypted keys obtained from a LKMS.

The method 1000 can include powering on a server, at 1002, and having the server's BIOS load a UEFI BIOS into memory of the server, at 1003. The UEFI BIOS may be configured to perform the security functions and communications herein and may be stored on a KMD. The UEFI BIOS may load a KMIP client into the server memory to allow a TPM of the server to communicate and access the LKMS, at 1004, such as via TCG protocols. As part of the boot process, the UEFI BIOS may unlock all registered drives or bands listed in a DIT.

To unlock the drives or bands, the method 1000 may include accessing a TPM within the server to obtain a key to unlock a secure area of the KMD that stores access key(s) (e.g. certificates) corresponding to SED(s). The secure area of the KMD may also store information to access a LKMS. Once the UEFI BIOS has access to TPM, the UEFI BIOS may utilize the TPM to unlock the first secure area on the KMD, at 1007. If the TPM does not grant access to the secure area, at 1008, the process may provide an error indicator, at 1036, store the error to a log file, at 1038, and may continue the boot process without unlocking any SEDs, at 1040.

When access to the secure area of the KMD is granted, the UEFI BIOS may load the drive information table ("DIT") into the server memory, at 1010, and the UEFI BIOS can determine if there are any DSDs or bands registered in the DIT, at 1012. In some cases, unique identifiers obtained from connected DSDs can be compared against the list of registered DSDs to determine if there are any DSDs or bands in the DIT. If there are no DSDs registered in the DIT, the process may relock the secure areas of the KMD, at 1035, and may continue with the boot process without unlocking any SEDs, at 1040. However, if there are DSDs registered in the DIT, the process may continue.

When at least one of the unique identifiers obtained from the DSDs coupled to the server corresponds to a unique identifier in the list of registered DSDs, the method 1000 can include retrieving a security key from the first secure area to unlock a second secure area that can function as a LKMS device, and then unlocking the second secure area, at 1009. Once the second secure area is unlocked, the method 1000 can include retrieving a security key (e.g. encrypted key) and a communication key from the secure storage area corresponding to a selected registered DSD or band, at 1014, by its unique stored ID. Steps 1009 and 1010 can be swapped in order in which they happen based on system design choices.

The method 1000 can include receiving the communication key and the encrypted key corresponding to the selected unique identifier from the LKMS, at 1016. When the communication key and the encrypted key are received, the communication key and the encrypted key may be stored to a memory. If the communication key and the encrypted key are not received, a DSD corresponding to the encrypted key will not be unlocked, and an error message can be reported or logged.

Using the communication key for communications with the DSD, the registered DSD or band corresponding to the communication key, the encrypted key and the selected unique identifier may be unlocked by the encrypted key, at 1018. The UEFI BIOS may also delete the local version of the communication key and the encrypted key from the memory, at 1020. In some embodiments, an area of the memory in which the encrypted key was stored may be overwritten with data patterns, such as a pattern of 0's or 1's, to erase the security key from the memory. Further, other secure ways of deleting an encrypted key may be utilized.

The method 1000 can include determining if the DSD was successfully unlocked, at 1022. In some examples, the UEFI BIOS can determine if the DSD was successfully unlocked based on the DSD's response to the unlock command. For example, a DSD can transmit a successful return indicator to the OS when the unlock command was successfully executed, and a non-successful return indicator to the OS when the unlock command was not successfully executed.

The success or failure of each DSD to unlock may be logged. For example, when the DSD was successfully unlocked, an entry indicating the DSD was successfully unlocked may be entered into a log, at 1023, and the method 1000 can include determining if there are more DSDs to unlock, at 1032. In some embodiments, the log may be stored in the KMD, in a server memory, in a portable memory, in another memory, or any combination thereof. When the DSD was not successfully unlocked, the method 1000 can include entering an entry indicating the DSD was not successfully unlocked into a log of errors, at 1024, and providing an error indicator indicating a security error, at 1026.

In some embodiments, the method 1000 may include providing the OS or a user with an option to stop the server's bootup process in response to a security error, at 1030. When the process is elected to be stopped, the bootup process and the method 1000 can end, at 1028. In some examples, the user may not be provided with an option to continue or stop the bootup process, at 1030; rather, the method 1000 may automatically end, at 1028, determine if there are other DSDs to unlock, at 1032, or perform other operations. If the bootup process is ended, at 1028, the method 1000 can also lock the secure area on the KMD, at 1028.

When the bootup process continues, the method 1000 can include determining if there are any other registered DSDs or bands to unlock, at 1032. In some embodiments, the OS can compare the unique identifiers obtained from the attached DSDs against a list of registered DSDs. If another of the unique identifiers obtained from the attached DSDs corresponds to a unique identifier from the list of registered DSDs, a communication key and an encrypted key corresponding to another selected unique identifier may be retrieved from the second encrypted area, at 1014, and the process can continue as described above. Further, the OS can determine when there are no more registered DSDs to unlock by requesting a registration status, an encrypted status, or both, from the attached DSDs. For example, a command may be sent to each of the attached DSDs to determine if any of the DSDs are still locked, or do not correspond to any unique identifier in the list of registered DSDs.

When all of the DSDs are unlocked, the method 1000 can lock the secure areas on the KMD, at 1035, and proceed to continue a boot process, at 1040. When some of the DSDs are still locked or are not in the list of registered DSDs, the method 1000 can lock the secure areas of the KMD, at 1035, and then continue with the boot process, at 1040.

In some systems, multiple encrypted keys may be obtained from the second secure area at a same time, or in response to a single request. For example, multiple unique identifies from the list of registered DSDs may be utilized in a single request to retrieve encrypted keys, and the LKMS may provide corresponding encrypted keys in a single response.

In some embodiments, an order in which the steps in the method 1000 may be changed. For example, in certain embodiments, operation 1026 may occur prior to operation 1024, or operation 1020 may occur after operation 1022.

In some embodiments in which public/private key pairs are used by the secure communication module for the communication with the DSDs regarding unlocking the DSDs or bands thereof, a symmetric key may be generated by the UEFI BIOS using the public key of the DSD and the private key of the KMD and the DSD may generate a symmetric key using the private key of the DSD and the public key of the KMD instead of using the public keys alone. Other similar operations may be used.

Figure 11:
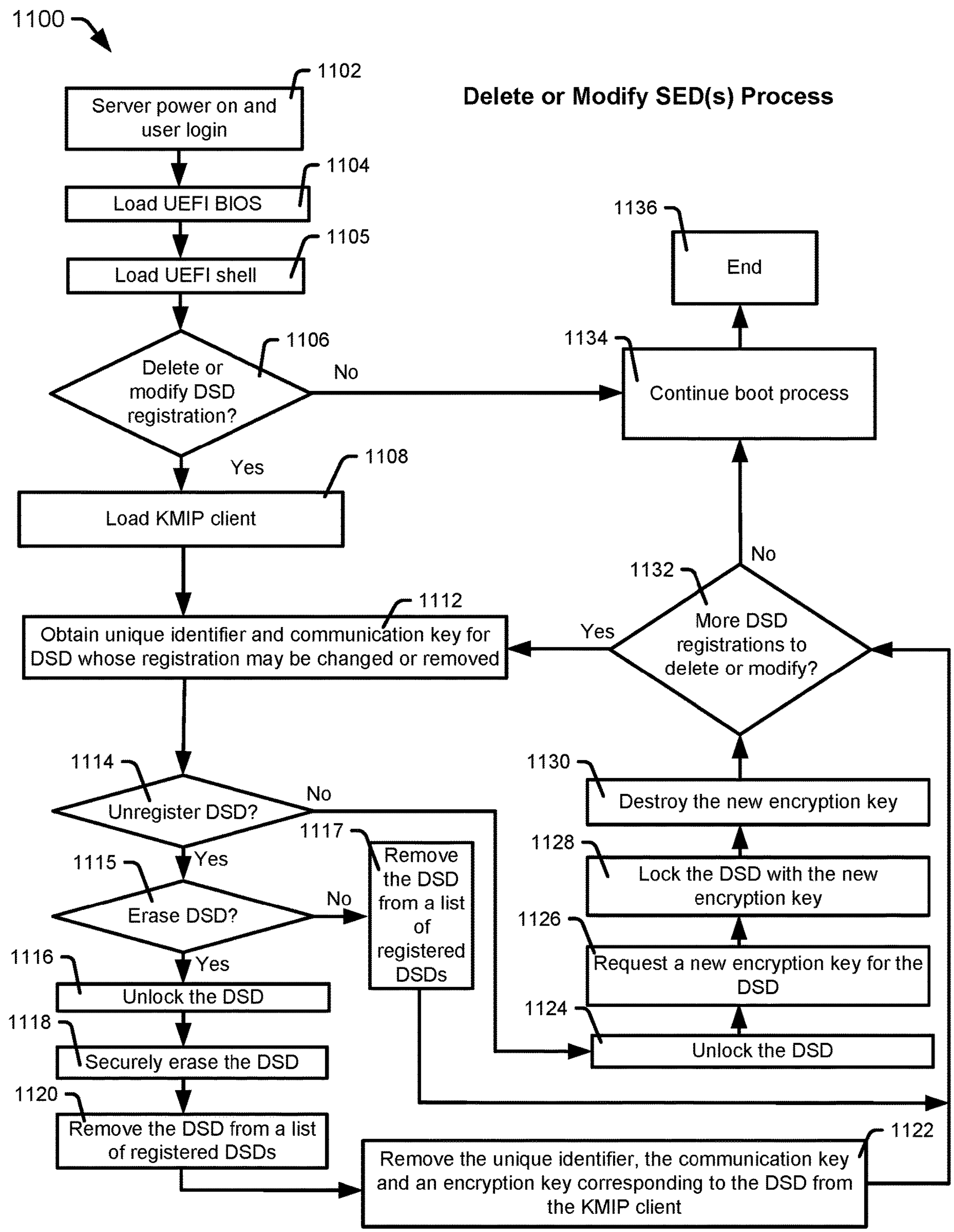
FIG. 11 is a flowchart of a method for unlocking self-encrypting data storage devices, in accordance with certain embodiments of the present disclosure.

Referring to FIG. 11, certain embodiments of a method for unlocking stand-alone self-encrypting data storage devices with a removable circuit are shown and generally designated 1100. The method 1100 may be implemented by the systems 100 and 300, according to certain embodiments. The method 1100 can delete or modify DSD registration(s).

The method 1100 can include powering on a server, at 1102, and loading a UEFI BIOS, at 1104. In some embodiments, a UEFI BIOS stored within a KMD can be loaded to run on the server and perform security operations to allow the KMD and server to perform the functions herein. The UEFI BIOS can load a UEFI registration shell, at 1105, which can include commands to allow modification or deletion of SEDs from a DIT. When a delete or modify command may be executed, at 1106, the method 1100 may load a KMIP client into the server memory to be executed to communicate with the LKMS module. Once the KMIP client achieves access to the LKMS, as described herein, the method 900 may obtain a unique identifier and a communication key for a DSD whose registration may be changed or removed, at 1112, such as from a DIT stored in the first secure storage area. In some examples, the KMD or other memory may include a list of DSDs to be unregistered and a list of DSDs whose registration may be changed or updated, and the KMD can select the unique identifier from the lists. The KMD can compare a DSD's unique identifier against a list of DSDs to be unregistered and a list of DSDs whose registration may change or need updating.

The method 1100 can include determining if the selected DSD may be updated (e.g. implement a new encryption key but not unregister the DSD), at 1114. When the selected DSD is to be updated, the method may use the communication key to communicate with and unlock the DSD, at 1124, determine a new encrypted key for the DSD, such as from a key generation circuit, at 1126, receive and lock the DSD with the new encrypted key, at 1128, and destroy the old encrypted key at the second secure storage area, at 1130. In some embodiments, the communication key may be updated in a similar fashion. The method may then determine if more DSDs need erasing or updating, at 1132. When there are no more DSD registrations to change or remove, the method 1100 can include continuing the boot process, at 1134, and ending, at 1136.

The method 1100 can include determining if the DSD to be unregistered can be erased, at 1115. In some circumstances, a DSD can be removed without securely erasing the data. In some examples, an erase indicator corresponding to the DSD may be included in the list of DSDs. When the DSD is to be removed (and not erased), the method 1100 can include removing the DSD from a list of registered DSDs, at 1117, and determining if there are more DSD registrations to erase or modify, at 1132.

When the DSD is to be erased, the method 1100 can include, using the communication key to communicate with the DSD, unlocking the DSD, at 1116. The method 1100 can include securely erasing the unlocked DSD, at 1118. In some embodiments, the DSD may be cryptographically erased. When a DSD is cryptographically erased, an encryption key protecting data of the DSD may be changed, and all record of the encryption key may be destroyed. Thus, any data encrypted by such key on the DSD may not be accessible. In some examples, the DSD may be physically erased using write patterns to continually overwrite the DSD, or a portion thereof, until no physical traces of useful data exist. In some embodiments, the communication key may be removed or changed in a similar fashion.

Once the DSD has been securely erased, the method 1100 can include removing the DSD from a list of registered DSDs, at 1120. The list of registered DSDs may be accessed and the unique identifier corresponding to the securely erased DSD may be removed.

The method 1100 can then include initiating the LKMS to remove (e.g. delete, erase) the unique identifier, the communication key and the encrypted key corresponding to the DSD from the second secure storage area, at 1122. The LKMS device may delete the encryption key from the second secure storage area.

The method 1100 can include determining if there are more DSDs to be unregistered or DSDs whose registration may be changed, at 1132. The method may determine if there are any more DSDs in the list of DSDs to unregister and the list of DSDs whose registration may be changed to determine if there are DSDs that have not yet been selected. When there are no more DSD registrations to change or DSDs to erase or remove, the method 1100 can include continuing a boot process, at 1134, and ending, at 1136.

When there are more DSD registrations to change or DSDs to update, erase, or remove, the method 1100 may repeat one or more of the steps.

One or more steps in the method 1100 may be optional. Further, in some examples, an order in which steps in the method 1100 are executed may change. For example, step 1122 may be executed before step 1120.

Figure 12:
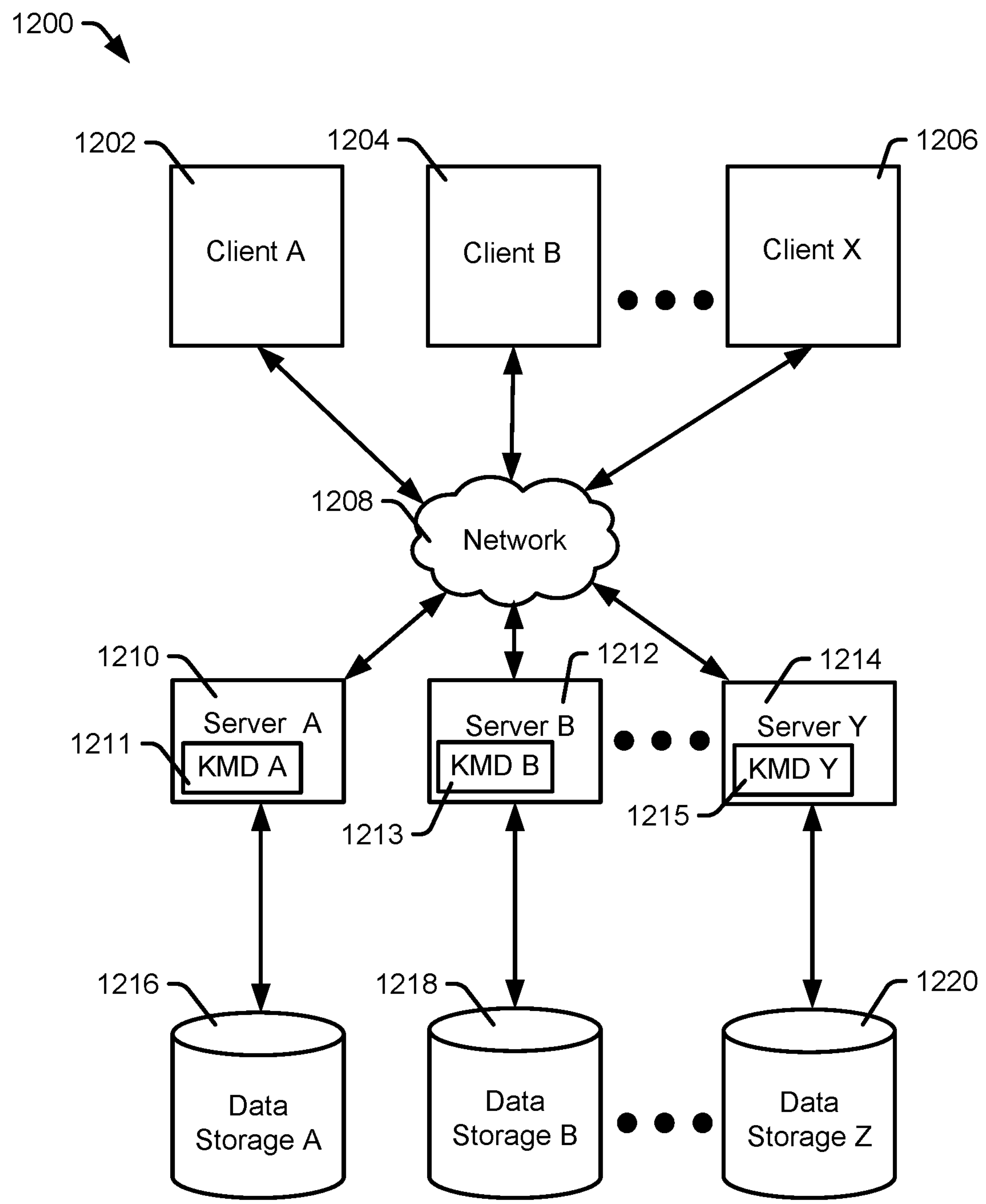
FIG. 12 is a diagram of a system of a removable circuit for unlocking self-encrypting data storage devices, in accordance with certain embodiments of the present disclosure.

Referring to FIG. 12, certain embodiments of a system of a removable circuit for unlocking self-encrypting data storage devices are shown and generally designated 1200. The system 1200 may be an example of the systems 100-300, according to certain embodiments. The system 1200 may be an example of a distributed file system, and may implement systems 100-300, and methods 400-1100, according to certain embodiments.

The distributed file system can allow one or more client nodes (e.g. A 1202, B 1204, and X 1206) to access data in arrays of data storage (e.g. A 1216, B 1218, and Y 1220) via a network 1208. Servers A 1210, B 1212, and Y 1214 can include KMDs A 1211, B 1213, and Y 1215 may be coupled to the arrays of data storage A 1216, B 1218, and Z 1220, respectively. In some examples, servers A 1210, B 1212, and Y 1214 may store data to, or obtain data from, the arrays of data storage A 1216, B 1218, and Z 1220 in response to client requests.

A KMD in one server may be communicatively coupled with data storage in other servers, and may manage the access functions thereof. In some examples, the KMD 1211 in server A 1210 may be communicatively coupled to data storage 1218, and the KMD 1211 can manage the certificates and access of data storage 1218.

In some examples, when the clients A 1202, B 1204, or X 1206, want to store or obtain data, a file system operation request may be transmitted to one or more of the servers A 1210, B 1212, and Y 1214 via the network 1208. The servers A 1210, B 1212, and Y 1214 may store all or part of the data to their corresponding data arrays of storage. In some cases, servers A 1210, B 1212, and Y 1214 may be file system servers, metadata servers, or other servers.

Figure 13:
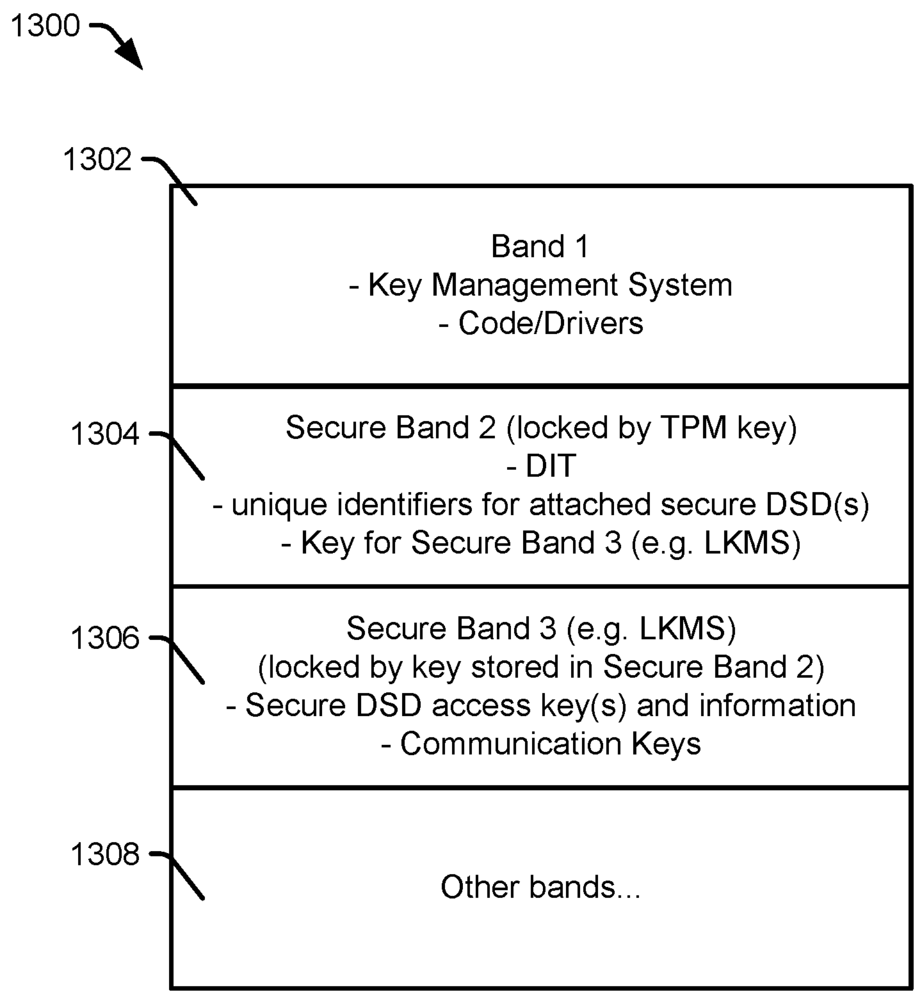
FIG. 13 is a diagram of a system of a removable circuit for unlocking self-encrypting data storage devices, in accordance with certain embodiments of the present disclosure.

Referring to FIG. 13, certain embodiments of a system of a removable circuit for unlocking self-encrypting data storage devices are shown and generally designated 1300. System 1300 is a representative drawing of logically organized areas of a data storage device's memory that can be utilized as KMD. The data storage memory may be divided into multiple bands, or reserved logical areas, such as Band 1 1302, Band 2 1304, Band 3 1306, and other bands 1308.

Band 1 1302 may be utilized to store a key management system (e.g. an OS or UEFI BIOS and UEFI shell) code that can be loaded to run in a host server system. Band 2 1304 may be utilized to store a DIT, unique identifiers for SEDs attached to a KMD's host, one or more keys to access another band, or any combination thereof. In some instances, the unique identifiers may be stored in the DIT or may be separately stored information. Band 2 1304 may be encrypted by a TPM of a host, thus the data in the band may be unusable unless the KMD having the memory is communicating with the proper host having the associated TPM. Band 3 1306 may store communication key(s) and access key(s) to allow the host to access SEDs of the server. Band 3 1306 may also be encrypted, though may be encrypted with key stored in band 2 1304. In some embodiments, the communication key(s) may be stored in Band 2 1304 instead of Band 3 1306.

Figure 14:
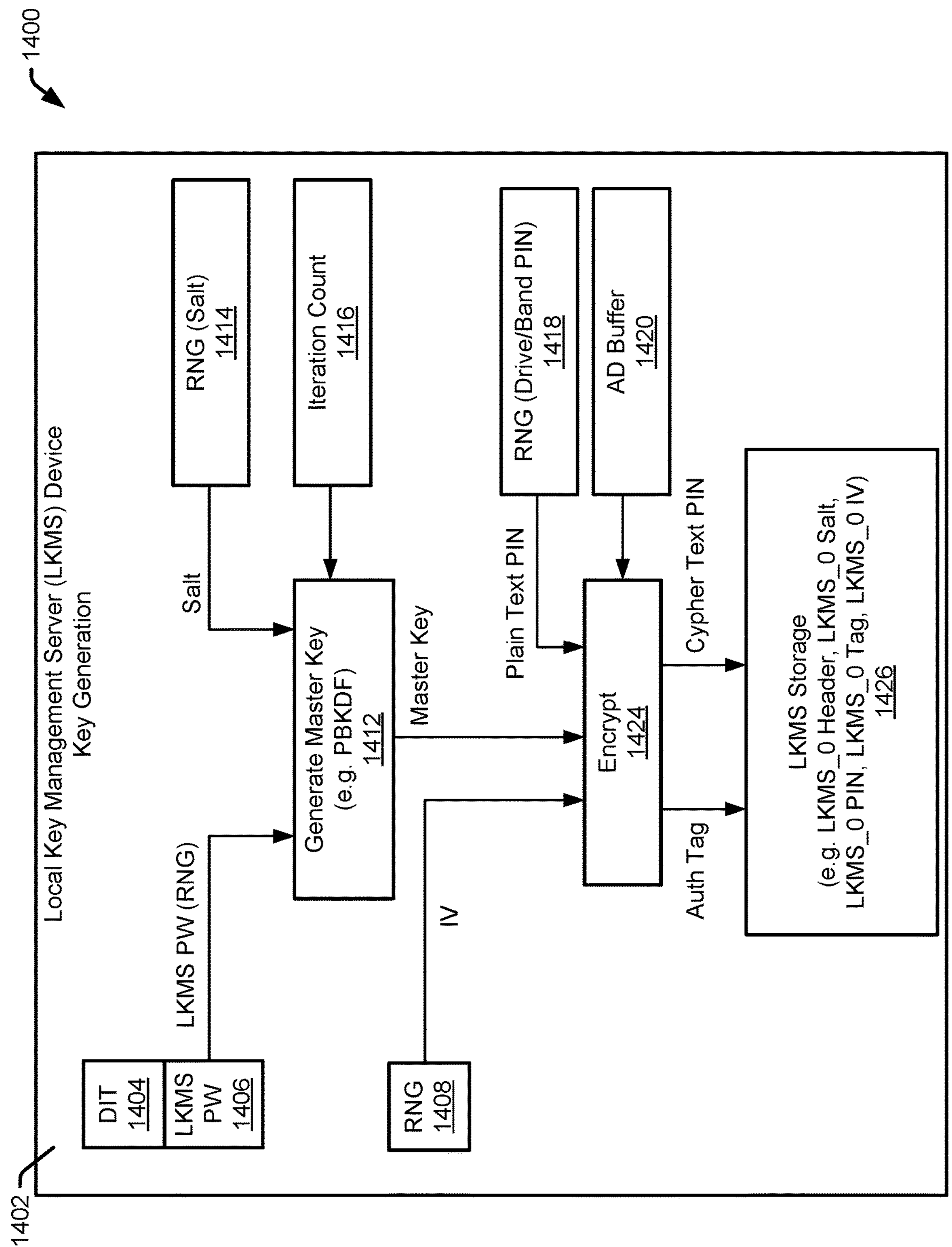
FIG. 14 is a diagram of a system of a removable circuit for unlocking self-encrypting data storage devices, in accordance with certain embodiments of the present disclosure.

Referring to FIG. 14, certain embodiments of a system of a removable circuit for unlocking self-encrypting data storage devices are shown and generally designated 1400. The system 1400 can include a LKMS device 1402 configured to generate a local key to lock a security enhanced data storage device, such as a self-encrypting drive (SED); thus, the system 1400 may be utilized with the others systems described herein. The LKMS device 1402 can be a controller, circuit, software, or a combination thereof that performs the functions of the LKMS device.

The LKMS device 1402 may be activated when a host system, such as server 202, is attempting to initialize an SED. The LKMS device 1402 may generate an encryption key or related information to be stored to a secure storage area 1426 of the LKMS storage device 1402, such as a lockable band or zone. A master key generation circuit 1412 may generate a master key based on an LKMS password from a generation circuit 1406, which may include a random number generator circuit; the LKMS password may be associated with a specific drive or band in a DIT 1404. The master key generation circuit 1412 may also receive a salt value from a random number generator circuit 1414 and receive an iteration count value from an iteration circuit 1416.

The LKMS device 1402 may generate the master key by utilizing a key generation circuit 1412. An example of a key generation that can be utilized may be a password-based key derivation function (PBKDF), such as PBKDF 2. The PBKDF may be a cryptographic hash or cipher that utilizes the salt value and repeats the process a number times based on the iteration count value to produce the master key based on the LKMS password. The iteration counter circuit 1416 may set the number of iterations for the key generation circuit, which may be constant or varied between different SEDs. However, the iteration count for a specific SED must be known in order to regenerate the master key relative to that specific SED, as the master key will need to be regenerated to access the SED. The master key is preferably never stored in a memory outside of the LKMS device 1402. Further, any other password hash function may be used to generate the master key.

Once the LKMS device 1402 has the master key generated, it may pass the master key to the encryption circuit 1424. The encryption circuit 1424 may receive an initialization value (IV) from a random number generator (RNG) circuit 1408 (or from a memory if the IV value is already stored) and receive an LKMS PIN, which can be a plain text personal identification number assigned to the specific SED that may be generated by a random number generator circuit 1418. The AD buffer 1420 may be used to store additional or auxiliary information such as other parameters that system or user could choose to combine with the master key to generate the cypher text PIN. The encryption circuit 1424 may use the master key, the IV, other information from the AD buffer, the plain text PIN, or any combination thereof, to generate a cypher text PIN associated with a specific secure area of a data storage device, such as a locked band or drive. The cypher text PIN and the respective IV may be stored to an array of the lockable band of the LKMS storage device.

The encryption circuit 1424 can generate an encrypted PIN and store the encrypted PIN in the LKMS secure storage area 1426. The encryption circuit 1424 can also generate an LKMS tag (e.g. authorization tag), which can be a set of information unique to an SED. The encryption circuit 1424 can also store the salt value, a header, and the LKMS tag to the LKMS secure storage area 1426. Some or all of the information may be stored in a secure band, such as the third band shown in FIG. 13.

The circuit 1400 may produce an LKMS tag and LKMS cypher text PIN for each encrypted storage area the LKMS system is managing. The information for each may be stored in an array in a secure storage area, such as the third band shown in FIG. 13. Thus, the process and circuits described with respect to the system 1400 may run for each unique secure storage area related to the LKMS. For example, LKMS_0 Header, LKMS_0 Salt, LKMS_0 PIN, LKMS_0 Tag, LKMS_0 IV may be stored for a first secure area or drive, where LKMS_1 Header, LKMS_1 Salt, LKMS_1 PIN, LKMS_1 Tag, LKMS_1 IV may be stored for a second secure area, and so on.

Figure 15:
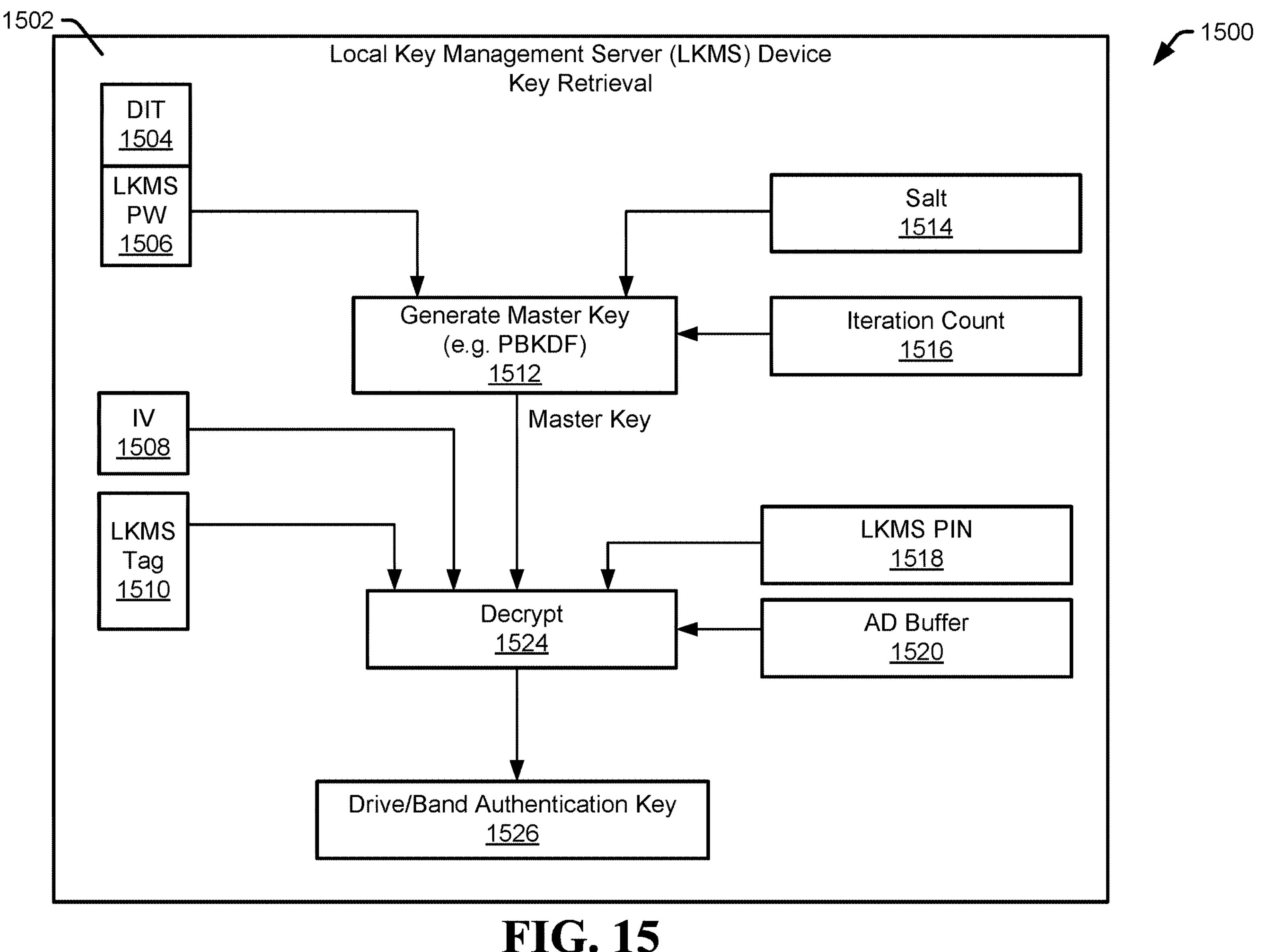
FIG. 15 is a diagram of a system of a removable circuit for unlocking self-encrypting data storage devices, in accordance with certain embodiments of the present disclosure.

Referring to FIG. 15, certain embodiments of a system of a removable circuit for unlocking self-encrypting data storage devices are shown and generally designated 1500. The system 1500 can include a LKMS device 1502 configured to retrieve a local key to unlock a security enhanced data storage device, such as a self-encrypting drive (SED); thus, the system 1500 may be utilized with the others systems described herein. The LKMS device 1502 can be a controller, circuit, software, or a combination thereof that performs the functions of the LKMS device.

The LKMS device 1502 may be activated when a host system, such as server 202, is attempting to access an SED. The LKMS device 1502 may generate a master key from an LKMS password 1506 associated with a secure area listed in a drive information table (DIT) 1504, a random number generator salt value from a random number generator circuit 1514, and an iteration count value from a counter circuit 1516. The salt value may be associated with the specific SED that is attempting to be accessed. Also, the counter 1516 may provide an iteration count, which may be a constant value associated with a specific SED.

The LKMS device 1502 may generate the master key by utilizing a key generation circuit 1512. An example of a key generation that can be utilized may be a password-based key derivation function (PBKDF), such as PBKDF 2. The PBKDF may be a cryptographic hash or cipher that utilizes the salt value and repeats the process a number times based on the iteration count value to produce the master key. The iteration counter circuit 1516 may set the number of iterations for the key generation circuit, which may be constant or varied between different SEDs. However, the iteration count for a specific SED must be known in order to generate the master key relative to that specific SED, otherwise the master key may not be able to be decrypted to access the SED. Further, any other password hash function may be used to determine the master key.

Once the LKMS device 1502 has the master key generated, it may pass the master key to the decryption circuit 1524. The decryption circuit 1524 may receive an initialization value 1508, an LKMS tag 1510, and an LKMS PIN (cypher text), which can be a cypher text personal identification number assigned to the specific SED. The LKMS PIN, LKMS IV, and LKMS tag may be retrieved from a locked band of the LKMS storage device, where the locked band was previously unlocked via the TPM or another key.

The decryption circuit 1524 may utilize the LKMS tag, the initialization value, the LKMS PIN, and the AD buffer 1520 information in conjunction with the master key to generate a plain text PIN that represents a drive authentication key for a specific SED. The decryption circuit may perform a reverse hash utilizing the received values and keys to generate the plain text PIN. The LKMS device 1502 can then pass the plain text PIN to a connected host, which can then utilize that PIN to unlock a specific SED or secure area.

The process described with respect to the system 1500 may be utilized for each instance of a secure storage area stored in an array of information. For example, as shown in FIG. 15, secure band 3 1306 may store an array of the information needed for the system 1500 to determine a plain text PIN corresponding to each secure area related to the LKMS 1502. In some examples, there may be hundreds or thousands of secure areas for which information is stored in the array; thus, the process of system 1502 would need to operate once for each area that is to be unlocked.

The devices, systems, and methods described herein can be implemented as stand-alone circuits or devices that are able to operate independently of other hardware or software. For example, a KMD (e.g. 108 or 212) may be a stand-alone circuit or device that utilizes an internal LKMS (e.g. 102 or 204) to implement the security processes described herein rather than utilizing a different LKMS that is at a different device. The stand-alone KMD can manage the security processes described herein independently of the host, such as the processes for locking or unlocking of SEDs.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:

a first data storage device (DSD) configured to:
- connect to be removable from a first server;
- load a key management system stored locally in the first data storage device into memory of the first server, the key management system configured to:
  - unlock a first secure area of the first DSD;
  - retrieve a first access key from the first secure area;
  - unlock a second secure area of the first DSD with the first access key;
  - retrieve a communication key from the first secure area or the second secure area;
  - determine a second access key based on information stored to the second secure area;
  - unlock a secure storage area of another data storage device with the second access key, the key management system configured to use the communication key to secure communication between the key management system and the other data storage device while performing the unlock of the secure storage area of the other data storage device;
- the key management system configured to:
  - determine if there is an unregistered DSD coupled to the first server, where an unregistered DSD is a DSD that does not have corresponding information stored in the second secure area from which a corresponding access key can be generated;
  - obtain a unique identifier from the unregistered DSD;
  - generate an encryption key based on the unique identifier;
  - lock the unregistered DSD with the encryption key;
  - generate another communication key;
  - configure the unregistered DSD to communicate with the key management system to unlock the unregistered DSD based at least in part on the other communication key; and
  - store the encryption key and the communication key in the second secure area.

2. The apparatus of claim 1 further comprising:

the key management system configured to:
- retrieve a drive information table (DIT) from the first secure area;
- determine a unique identifier corresponding to the another data storage device; and
- request the communication key based on the unique identifier.

3. The apparatus of claim 2 further comprising:

the first DSD configured to:
- connect to be removable from the first server by a physical and electrical connection to the first server which allows the first DSD to be removed from the first server without physically modifying the first server.

4. The apparatus of claim 1 further comprising:

the key management system configured to:
- access an encrypted hardware module of the first server;
- obtain access to the first secure area of the first DSD via the encrypted hardware module; and
- retrieve the first access key from the first secure area when access is granted to the key management system.

5. The apparatus of claim 1 further comprising:

the first server coupled to the first DSD, the first server including an encrypted hardware module configured to manage secure access to the first secure area; and the key management system configured to:
- obtain access to the first secure area of the first DSD via the encrypted hardware module; and
- retrieve the first access key from the first secure area.

6. An apparatus comprising:

a first data storage device (DSD) configured to:
- connect to be removable from a first server;
- load a key management system stored locally in the first data storage device into memory of the first server, the key management system configured to:
  - unlock a first secure area of the first DSD;
  - retrieve a first access key from the first secure area;
  - unlock a second secure area of the first DSD with the first access key;
  - retrieve a communication key from the first secure area or the second secure area;
  - determine a second access key based on information stored to the second secure area;
  - unlock a secure storage area of another data storage device with the second access key, the key management system configured to use the communication key to secure communication between the key management system and the other data storage device while performing the unlock of the secure storage area of the other data storage device;
- the key management system configured to:
  - determine if there is a registered DSD to be unregistered coupled to the first server;

obtain a unique identifier from the registered DSD to be unregistered;

retrieve another communication key from the first secure area or the second secure area based on the unique identifier;

retrieve an encryption key from the second secure area based on the unique identifier;

unlock the registered DSD to be unregistered with the encryption key, the key management system configured to use the other communication key to secure communication between the key management system and the registered DSD while performing the unlock of the secure storage area of the registered DSD;

erase the unregistered DSD; and delete the unique identifier, the communication key and the encryption key from the second secure area.

7. The apparatus of claim 6 further comprising:

the first server coupled to the first data storage device, the first server including a memory within the first server storing a native operating system configured to operate the first server, the native operating system different than the key management system; and a drive information table stored within the first secure area, the drive information table identifying whether encrypted other data storage devices have registered keys stored in the second secure area.

8. The apparatus of claim 6 further comprising the key management system configured to:

obtain access to the first secure area of the first DSD via an encrypted hardware module of the first server; and retrieve the first access key from the first secure area.

9. An apparatus comprising:

a first data storage device (DSD) configured to:

connect to be removable from a first server;

load a key management system stored locally in the first data storage device into memory of the first server, the key management system configured to:

unlock a first secure area of the first DSD;

retrieve a first access key from the first secure area;

unlock a second secure area of the first DSD with the first access key;

retrieve a communication key from the first secure area or the second secure area;

determine a second access key based on information stored to the second secure area;

unlock a secure storage area of another data storage device with the second access key, the key management system configured to use the communication key to secure communication between the key management system and the other data storage device while performing the unlock of the secure storage area of the other data storage device;

the key management system configured to:

determine if there is a DSD registration to modify corresponding to a selected DSD coupled to the first server;

obtain a unique identifier from the selected DSD;

retrieve another communication key from the first secure area or the second secure area based on the unique identifier;

retrieve an encryption key from the second secure area based on the unique identifier;

unlock the selected DSD with the encryption key, the key management system configured to use the other communication key to secure communication between the key management system and the selected DSD while performing the unlock of the secure storage area of the selected DSD;

generate a different encryption key associated with the unique identifier;

lock the selected DSD with the different encryption key; and store the different encryption key in the second secure area.

10. The apparatus of claim 9 further comprising:

the key management system configured to:

retrieve a drive information table (DIT) from the first secure area, the drive information table identifying whether encrypted data storage devices connected to the first server have keys stored to the second secure area;

determine a unique identifier corresponding to another data storage device; and request the communication key based on the unique identifier.

11. The apparatus of claim 9 further comprising the first server that includes:

an encrypted hardware module configured to manage secure access to the first secure area; and the key management system configured to:

obtain access to the first secure area of the first DSD via the encrypted hardware module; and retrieve the first access key from the first secure area.

12. A system comprising:

a first data storage device configured to be connectable and removable from a first server, the first data storage device including:

an interface circuit;

a first secure nonvolatile data storage area;

a second secure nonvolatile data storage area;

a memory storing a key management system;

a controller configured to:

load the key management system into memory of the first server, the key management system configured to:

access a hardware encryption circuit of the first server;

obtain access to the first secure nonvolatile data storage area via the hardware encryption circuit;

retrieve a first access key from the first secure nonvolatile data storage area when access is granted to the key management system;

obtain access to the second secure nonvolatile data storage area via the first access key;

retrieve a communication key from the first secure nonvolatile data storage area or the second secure nonvolatile data storage area;

determine a second access key based on information stored to the second secure nonvolatile data storage area; and unlock, via the second access key, an encrypted second data storage device ("DSD") connected to the first server, the key management system configured to use the communication key to secure communication between the key management system and the encrypted second DSD while performing the unlock of the encrypted second DSD;

the key management system configured to:

implement an automatic device registration mode whereby each encrypted DSD connected to the first server that is not registered and does not have a corresponding authentication certificate and key at the second secure nonvolatile data storage area is automatically determined;

automatically initiate registration of any unregistered encrypted DSDs;

generate a particular communication key corresponding to each unregistered encrypted DSD;

generate a particular encryption key corresponding to each unregistered encrypted DSD;

lock each encrypted DSD with each encrypted DSD's corresponding key received from the second secure nonvolatile data storage area;

configure each encrypted DSD to use the corresponding particular communication key to secure communication between the key management system and a corresponding encrypted DSD when the key management system is performing the unlocking of the corresponding encrypted DSD;

update a drive information table to indicate each encrypted DSD is registered; and store each encrypted DSD's corresponding particular communication key and corresponding particular encryption key in the second secure nonvolatile data storage.

13. The system of claim 12 further comprising:

the system includes the first server coupled to the first data storage device;

the hardware encryption circuit includes a cryptographic integrated circuit within the first server that is not within the first data storage device;

an array of encrypted other data storage devices within the first server, the encrypted second data storage device being included in the array of encrypted other data storage devices;

a drive information table stored within the first secure nonvolatile data storage area, the drive information table identifying whether the encrypted other data storage devices have keys registered with the second secure nonvolatile data storage area; and a memory within the first server storing a native operating system configured to operate the first server, the native operating system different than the key management system.

14. The system of claim 13 further comprising each encrypted data storage device includes a setting to activate a lock-on-power-cycle feature which forces a such encrypted data storage device to become locked if there is an unexpected power event.

15. The system of claim 13 further comprising a drive information table stored within the secure nonvolatile data storage area, the drive information table identifying whether encrypted data storage devices connected to the first server have keys registered with the second secure nonvolatile data storage area.

16. The system of claim 12 further comprising:

the key management system configured to:

determine if the encrypted second data storage device has been unlocked; and provide an error indicator when the encrypted second data storage device has not been unlocked.

17. The system of claim 12 further comprising:

a server that includes:

the first data storage device and the second data storage device; and an encrypted hardware module configured to manage secure access to the first secure nonvolatile data storage area.

18. The system of claim 12 further comprising:

the key management system configured to:

implement a manual registration mode whereby a user can submit a command to the key management system to have an encrypted DSD that is not registered manually registered.

19. The system of claim 12 further comprising:

the first data storage device configured to be connected and removed from the first server while the first server is powered on.

20. The system of claim 12 further comprising:

the first data storage device is located outside of the first server; and the first data storage device is physically connected and disconnected from the first server via an external interface without physically modifying the first server.

* * * * *